(12) United States Patent
Ophardt

(10) Patent No.: US 12,178,369 B2
(45) Date of Patent: Dec. 31, 2024

(54) FLUID DISPENSER WITH THERMOMETER

(71) Applicant: OP-HYGIENE IP GMBH, Niederbipp (CH)

(72) Inventor: Heiner Ophardt, Arisdorf (CH)

(73) Assignee: OP-HYGIENE IP GMBH, Niederbipp (CH)

( * ) Notice: Subject to any disclaimer, the term of this patent is extended or adjusted under 35 U.S.C. 154(b) by 0 days.

(21) Appl. No.: 18/591,785

(22) Filed: Feb. 29, 2024

(65) Prior Publication Data

US 2024/0197119 A1 Jun. 20, 2024

Related U.S. Application Data

(63) Continuation of application No. 18/118,476, filed on Mar. 7, 2023, now Pat. No. 11,957,284, which is a continuation of application No. 17/374,638, filed on Jul. 13, 2021, now Pat. No. 11,622,656.

(30) Foreign Application Priority Data

Jul. 14, 2020 (CA) .................................. CA 3086861

(51) Int. Cl.
*A47K 5/12* (2006.01)
*G01J 5/00* (2022.01)

(52) U.S. Cl.
CPC .......... *A47K 5/1217* (2013.01); *G01J 5/0025* (2013.01)

(58) Field of Classification Search
CPC .... A47K 5/1217; A47K 5/1205; G01J 5/0025
See application file for complete search history.

(56) References Cited

U.S. PATENT DOCUMENTS

| | | | | |
|---|---|---|---|---|
| 5,373,970 A | * | 12/1994 | Ophardt | A47K 5/1207 222/325 |
| 5,836,482 A | * | 11/1998 | Ophardt | A47K 5/1202 222/325 |
| 7,748,573 B2 | | 7/2010 | Anhuf et al. | |
| 8,113,388 B2 | | 2/2012 | Ophardt et al. | |
| 8,245,877 B2 | | 8/2012 | Ophardt et al. | |
| 8,397,949 B2 | | 3/2013 | Ophardt et al. | |
| 8,413,852 B2 | | 4/2013 | Ophardt et al. | |
| 9,682,390 B2 | | 6/2017 | Ophardt et al. | |
| 10,242,301 B2 | | 3/2019 | Ophardt et al. | |
| 2009/0204256 A1 | * | 8/2009 | Wegelin | G01F 15/068 700/244 |
| 2010/0106048 A1 | | 4/2010 | Krullaards | |
| 2010/0230435 A1 | | 9/2010 | Weglin | |
| 2012/0234858 A1 | | 9/2012 | Ophardt | |

(Continued)

OTHER PUBLICATIONS

Palm Secure, Palm Vein Authentication System, Fujitsu 2000-2009, 4 pages.

*Primary Examiner* — Donnell A Long
(74) *Attorney, Agent, or Firm* — Thorpe North & Western, LLP

(57) ABSTRACT

A fluid dispenser having a temperature sensor that senses a temperature of an external surface presented by a user's hand, and a pump mechanism that is configured to dispense fluid onto the user's hand when the pump mechanism is activated. It is determined whether the fluid has been dispensed onto the user's hand based, at least in part, on the temperature of the external surface presented by the user's hand.

20 Claims, 9 Drawing Sheets

(56) References Cited

U.S. PATENT DOCUMENTS

2015/0173567 A1* 6/2015 Buckalter ............. B05B 12/122
　　　　　　　　　　　　　　　　　　　　　　222/173
2015/0259128 A1   9/2015  Buckalter et al.
2020/0320330 A1  10/2020  Ophardt et al.
2021/0404855 A1* 12/2021  Wegelin ................ B05B 12/004

* cited by examiner

FLUID DISPENSER WITH THERMOMETER

PRIORITY CLAIM

This is a continuation of U.S. patent application Ser. No. 18/118,476, filed Mar. 7, 2023; which is a continuation of U.S. patent application Ser. No. 17/374,638, filed Jul. 13, 2021, now U.S. Pat. No. 11,622,656; which claims priority to Canadian Patent Application No. 3086861, filed Jul. 14, 2020; which are hereby incorporated herein by reference.

FIELD OF THE INVENTION

This invention relates to hand cleaning fluid dispensers, and more particularly to smart dispensers that are able to calculate or estimate the volume of fluid that has been dispensed.

BACKGROUND OF THE INVENTION

Many known hand cleaning fluid dispensers are able to calculate or estimate the volume of fluid that is dispensed from the dispenser over time. This information can be used for a variety of purposes, such as for predicting when a fluid reservoir of the fluid dispenser will need to be refilled or replaced. A typical method of determining the volume of fluid that has been dispensed over time is by multiplying the number of times that the dispenser has been activated by the known or estimated average volume of fluid that is dispensed from the dispenser with each activation.

The applicant has appreciated a disadvantage of the prior art is that fluid dispensers do not always dispense a dose of fluid when activated. This may occur, for example, if a pump mechanism of the fluid dispenser needs to be primed, if the fluid reservoir is empty, or if the pump mechanism is malfunctioning. Prior art methods that assume fluid is dispensed with each activation therefore risk providing an inaccurate measurement of the volume of fluid that is dispensed from a fluid dispenser over time.

SUMMARY OF THE INVENTION

To at least partially overcome some of the disadvantages of previously known methods and devices, the present invention provides a method comprising using a temperature sensor to sense the temperature of an external surface presented by an object; and determining, based at least in part on the temperature of the external surface presented by the object, whether fluid has been dispensed from a fluid dispenser onto the object. The inventors have appreciated that in at least some circumstances the temperature of an external surface presented by an object can advantageously be used to provide an indication as to whether fluid has been dispensed onto the object. For example, the temperature of a user's hand will typically be higher than the temperature of a hand cleaning fluid stored in a fluid reservoir of a hand cleaning fluid dispenser. When the hand cleaning fluid is dispensed onto the user's hand, there would therefore normally be a detectable decrease in the temperature of the external surface presented by the user's hand.

The inventors have appreciated that detecting when hand cleaning fluid has been dispensed onto a user's hand, based at least in part on the temperature of the external surface presented by the user's hand, can be useful, for example, for determining the volume of fluid dispensed from a hand cleaning fluid dispenser over time. The volume of fluid dispensed over time can, for example, be calculated by multiplying the expected volume of fluid dispensed with each activation of a pump mechanism of the fluid dispenser by the number of activations in which it is determined, based at least in part on the temperature of an external surface presented by the user's hand, that fluid has been dispensed onto the user's hand. This method of calculating the volume of fluid is preferably more accurate than merely multiplying the expected volume of fluid dispensed with each activation by the total number of activations, since activations in which no fluid is dispensed can be excluded from the tally. Activations in which no fluid is dispensed may occur, for example, when the dispenser needs to be primed. Priming a hand cleaning fluid dispenser typically requires the pump mechanism to be activated one or more times to replace any air or gas present in the pump mechanism with fluid drawn from the fluid reservoir.

The inventors have appreciated that being able to determine the volume of fluid that has been dispensed from a fluid dispenser may be advantageous for a variety of reasons. For example, if the volume of fluid that is initially contained in a fluid reservoir is known, then knowing the volume of fluid that has been dispensed from the fluid reservoir can be used to help determine when the fluid reservoir needs to be refilled or replaced. Information about the volume of fluid dispensed over time may also be useful, for example, for monitoring hand hygiene compliance or analyzing dispenser performance.

The fluid dispenser optionally has an indicator light that is configured to light up green when a user has dispensed a threshold volume of the hand cleaning fluid onto the user's hand. The threshold volume may, for example, be a pre-selected quantity of fluid that is required under an applicable hand hygiene standard. A processor or a computer associated with the fluid dispenser is preferably configured to determine whether the threshold volume of fluid has been dispensed onto the user's hand based, at least in part, on the temperature of the external surface presented by the user's hand. In some embodiments of the invention, the processor or computer may, for example, be programmed to determine that the volume of the fluid that has been dispensed from the fluid dispenser remains unchanged if the pump mechanism is activated, but the determination is made that no fluid has been dispensed onto the user's hand based at least in part on the temperature of the external surface presented by the user's hand. As contrasted with an alternative arrangement in which the processor or computer assumes that fluid is dispensed with each activation, this programming preferably helps to reduce the risk of the indicator light lighting up green prematurely, before the threshold volume of fluid has been dispensed. Optionally, the indicator light is configured to light up red if an insufficient volume of fluid has been dispensed during a user interaction.

The inventors have also appreciated that the temperature of an external surface presented by an object other than a user's hand could also be used to assist in determining when fluid has been dispensed from a fluid dispenser. For example, in some embodiments of the invention the temperature sensor is configured to sense the temperature of an external surface presented by a drip tray positioned below a fluid outlet of the dispenser. The inventors have appreciated that the temperature of the external surface presented by a drip tray will, in at least some circumstances, decrease when fluid is dispensed onto the drip tray. This cooling may occur, for example, due to the evaporation of the fluid. Hand cleaning fluids that evaporate rapidly, such as hand sanitizers with a high concentration of alcohol, may have a particularly pronounced cooling effect.

The inventors have appreciated that being able to determine whether fluid has been dispensed onto the drip tray may be useful for a variety of reasons. For example, in some embodiments of the invention, the fluid dispenser may be configured to prime itself periodically using an electronic pump activation mechanism. Determining when the fluid has been dispensed onto the drip tray, based at least in part on the temperature of the external surface presented by the drip tray, allows a processor or computer associated with the fluid dispenser to determine when the fluid has been dispensed, and therefore when the pump has been adequately primed.

Accordingly, in a first aspect the present invention resides in a method comprising: providing a fluid dispenser having a temperature sensor that senses a temperature of an external surface presented by a user's hand, and a pump mechanism that is configured to dispense fluid onto the user's hand when the pump mechanism is activated; using the temperature sensor to sense the temperature of the external surface presented by the user's hand; and determining, based at least in part on the temperature of the external surface presented by the user's hand, whether the fluid has been dispensed onto the user's hand.

In a second aspect, the invention resides in a method, which optionally incorporates one or more features of the first aspect, wherein the determination as to whether the fluid has been dispensed onto the user's hand is based at least in part on whether the temperature sensor senses a decrease in the temperature of the external surface presented by the user's hand over time.

In a third aspect, the invention resides in a method, which optionally incorporates one or more features of one or more of the first aspect and the second aspect, wherein the determination as to whether the fluid has been dispensed onto the user's hand is based at least in part on a comparison between the temperature of the external surface presented by the user's hand as sensed by the temperature sensor in a first temperature measurement, and the temperature of the external surface presented by the user's hand as sensed by the temperature sensor in a second temperature measurement that occurs after the first temperature measurement; wherein the first temperature measurement occurs before the activation of the pump mechanism or during the activation of the pump mechanism; and wherein the second temperature measurement occurs during the activation of the pump mechanism or after the activation of the pump mechanism.

In a fourth aspect, the invention resides in a method, which optionally incorporates one or more features of one or more of the first to third aspects, wherein the determination as to whether the fluid has been dispensed onto the user's hand is based at least in part on whether the temperature of the external surface presented by the user's hand as sensed by the temperature sensor in the second temperature measurement is lower by at least a threshold amount in comparison to the temperature of the external surface presented by the user's hand as sensed by the temperature sensor in the first temperature measurement.

In a fifth aspect, the invention resides in a method, which optionally incorporates one or more features of one or more of the first to fourth aspects, further comprising: determining a volume of the fluid that has been dispensed from the fluid dispenser based at least in part on the temperature of the external surface presented by the user's hand.

In a sixth aspect, the invention resides in a method, which optionally incorporates one or more features of one or more of the first to fifth aspects, wherein determining the volume of the fluid that has been dispensed from the fluid dispenser comprises: determining that the volume of the fluid that has been dispensed from the fluid dispenser has increased if the pump mechanism is activated and the determination is made that the fluid has been dispensed onto the user's hand based at least in part on the temperature of the external surface presented by the user's hand.

In a seventh aspect, the invention resides in a method, which optionally incorporates one or more features of one or more of the first to sixth aspects, wherein determining the volume of the fluid that has been dispensed from the fluid dispenser comprises: determining that the volume of the fluid that has been dispensed from the fluid dispenser remains unchanged if the pump mechanism is activated and the determination is made that no fluid has been dispensed onto the user's hand based at least in part on the temperature of the external surface presented by the user's hand.

In an eighth aspect, the invention resides in a method, which optionally incorporates one or more features of one or more of the first to seventh aspects, wherein determining the volume of the fluid that has been dispensed from the fluid dispenser comprises determining the volume of the fluid that has been dispensed from the fluid dispenser with each activation of the pump mechanism.

In a ninth aspect, the invention resides in a method, which optionally incorporates one or more features of one or more of the first to eighth aspects, wherein determining the volume of the fluid that has been dispensed from the fluid dispenser comprises determining the volume of the fluid that has been dispensed from the fluid dispenser during a user interaction with the dispenser, wherein the user interaction includes one or more activations of the pump mechanism.

In a tenth aspect, the invention resides in a method, which optionally incorporates one or more features of one or more of the first to ninth aspects, further comprising determining whether the volume of the fluid that has been dispensed from the fluid dispenser during the user interaction is equal to or greater than a threshold volume.

In an eleventh aspect, the invention resides in a method, which optionally incorporates one or more features of one or more of the first to tenth aspects, further comprising: if the volume of the fluid that has been dispensed from the fluid dispenser during the user interaction is equal to or greater than the threshold volume, providing an indication that the volume of the fluid that has been dispensed from the fluid dispenser during the user interaction is equal to or greater than the threshold volume.

In a twelfth aspect, the invention resides in a method, which optionally incorporates one or more features of one or more of the first to eleventh aspects, wherein providing the indication that the volume of the fluid that has been dispensed from the fluid dispenser during the user interaction is equal to or greater than the threshold volume comprises changing an illumination state of an indicator light.

In a thirteenth aspect, the invention resides in a method, which optionally incorporates one or more features of one or more of the first to twelfth aspects, further comprising: if the volume of the fluid that has been dispensed from the fluid dispenser during the user interaction is less than the threshold volume, providing an indication that the volume of the fluid that has been dispensed from the fluid dispenser during the user interaction is less than the threshold volume.

In a fourteenth aspect, the invention resides in a method, which optionally incorporates one or more features of one or more of the first to thirteenth aspects, wherein providing the indication that the volume of the fluid that has been dispensed from the fluid dispenser during the user interaction is less than the threshold volume comprises changing an illumination state of an indicator light.

In a fifteenth aspect, the invention resides in a method, which optionally incorporates one or more features of one or more of the first to fourteenth aspects, further comprising determining that the user interaction has begun based at least in part on at least one of: detection of a user by a user sensor; detection of the user's hand by a hand sensor; and detection of the activation of the pump mechanism by a pump activation sensor.

In a sixteenth aspect, the invention resides in a method, which optionally incorporates one or more features of one or more of the first to fifteenth aspects, further comprising determining that the user interaction has ended based at least in part on at least one of: detection data from the user sensor indicating that the user has moved away from the fluid dispenser; detection data from the hand sensor indicating that the user's hand has moved away from the fluid dispenser; and timer data indicating that a threshold amount of time has passed since at least one of: the user was detected by the user sensor; the user's hand was detected by the hand sensor; and the pump mechanism was activated.

In a seventeenth aspect, the invention resides in a method, which optionally incorporates one or more features of one or more of the first to sixteenth aspects, wherein the fluid dispenser further comprises a fluid reservoir for containing the fluid to be dispensed; and wherein determining the volume of the fluid that has been dispensed from the fluid dispenser comprises determining the volume of the fluid that has been dispensed from the fluid dispenser during a reservoir usage period, the reservoir usage period comprising a time period that commences when the fluid reservoir is installed or is refilled with the fluid, and ends when the fluid reservoir is replaced or is subsequently refilled.

In an eighteenth aspect, the invention resides in a method, which optionally incorporates one or more features of one or more of the first to seventeenth aspects, further comprising determining whether the volume of the fluid that has been dispensed from the fluid dispenser during the reservoir usage period is equal to or greater than a reservoir threshold volume.

In a nineteenth aspect, the invention resides in a method, which optionally incorporates one or more features of one or more of the first to eighteenth aspects, further comprising: if the volume of the fluid that has been dispensed from the fluid dispenser during the reservoir usage period is equal to or greater than the reservoir threshold volume, providing an indication that the volume of the fluid that has been dispensed from the fluid dispenser during the reservoir usage period is equal to or greater than the reservoir threshold volume.

In a twentieth aspect, the invention resides in a method, which optionally incorporates one or more features of one or more of the first to nineteenth aspects, wherein providing the indication that the volume of the fluid that has been dispensed from the fluid dispenser during the reservoir usage period is equal to or greater than the reservoir threshold volume comprises at least one of: changing an illumination state of an indicator light; and generating an alert indicating that the fluid reservoir needs to be replaced or refilled.

In a twenty first aspect, the invention resides in a method, which optionally incorporates one or more features of one or more of the first to twentieth aspects, further comprising monitoring the volume of the fluid that has been dispensed from the fluid dispenser over time using a usage monitoring system.

In a twenty second aspect, the invention resides in a method, which optionally incorporates one or more features of one or more of the first to twenty first aspects, further comprising recording each instance in which the pump mechanism was activated and the determination was made that no fluid was dispensed onto the user's hand.

In a twenty third aspect, the invention resides in a method, which optionally incorporates one or more features of one or more of the first to twenty second aspects, further comprising monitoring over time the instances in which the pump mechanism was activated and the determination was made that no fluid was dispensed onto the user's hand using a dispenser monitoring system.

In a twenty fourth aspect, the invention resides in a method, which optionally incorporates one or more features of one or more of the first to twenty third aspects, further comprising determining whether a quantity of the instances in which the pump mechanism was activated and the determination was made that no fluid was dispensed onto the user's hand exceeds a threshold quantity.

In a twenty fifth aspect, the invention resides in a method, which optionally incorporates one or more features of one or more of the first to twenty fourth aspects, wherein the threshold quantity comprises at least one of: a number of the activations of the pump mechanism in a row in which the determination was made that no fluid was dispensed onto the user's hand; a number of the activations of the pump mechanism over a time period in which the determination was made that no fluid was dispensed onto the user's hand; and a percentage of the activations of the pump mechanism in which the determination was made that no fluid was dispensed onto the user's hand.

In a twenty sixth aspect, the invention resides in a method, which optionally incorporates one or more features of one or more of the first to twenty seventh aspects, further comprising: if the quantity of the instances in which the pump mechanism was activated and the determination was made that no fluid was dispensed onto the user's hand exceeds the threshold quantity, providing an indication that the quantity of the instances in which the pump mechanism was activated and the determination was made that no fluid was dispensed onto the user's hand exceeds the threshold quantity.

In a twenty seventh aspect, the invention resides in a method, which optionally incorporates one or more features of one or more of the first to twenty sixth aspects, wherein providing the indication that the quantity of the instances in which the pump mechanism was activated and the determination was made that no fluid was dispensed onto the user's hand exceeds the threshold quantity comprises at least one of: providing an out of order message; and generating an alert indicating that the fluid dispenser requires service.

In a twenty eighth aspect, the invention resides in a method, which optionally incorporates one or more features of one or more of the first to twenty seventh aspects, wherein the fluid dispenser has an electronic pump activation mechanism for activating the pump mechanism, the method further comprising: using the electronic pump activation mechanism to activate the pump mechanism in a first activation time period; determining, based at least in part on the temperature of the external surface presented by the user's hand, whether the fluid has been dispensed onto the user's hand in the first activation time period; and if the determination is made that no fluid was dispensed onto the user's hand in the first activation time period, repeatedly using the electronic pump activation mechanism to activate the pump mechanism in subsequent activation time periods until a stop condition is satisfied.

In a twenty ninth aspect, the invention resides in a method, which optionally incorporates one or more features of one or more of the first to twenty eighth aspects, wherein satisfying the stop condition requires, at least in part, at least one of: determining that the fluid has been dispensed onto the user's hand based at least in part on the temperature of the external surface presented by the user's hand; determining that a threshold dose of the fluid has been dispensed from the fluid dispenser; and determining that a quantity of the activations of the pump mechanism exceeds a threshold activation quantity.

In a thirtieth aspect, the invention resides in a method, which optionally incorporates one or more features of one or more of the first to twenty ninth aspects, comprising: providing a fluid dispenser having a temperature sensor that senses a temperature of an external surface presented by a drip tray, and a pump mechanism that is configured to dispense fluid when the pump mechanism is activated; using the temperature sensor to sense the temperature of the external surface presented by the drip tray; and determining, based at least in part on the temperature of the external surface presented by the drip tray, whether the fluid has been dispensed.

In a thirty first aspect, the invention resides in a method, which optionally incorporates one or more features of one or more of the first to thirtieth aspects, wherein the determination as to whether the fluid has been dispensed is based at least in part on whether the temperature sensor senses a decrease in the temperature of the external surface presented by the drip tray over time.

In a thirty second aspect, the invention resides in a method, which optionally incorporates one or more features of one or more of the first to thirty first aspects, wherein the determination as to whether the fluid has been dispensed is based at least in part on a comparison between the temperature of the external surface presented by the drip tray as sensed by the temperature sensor in a first temperature measurement, and the temperature of the external surface presented by the drip tray as sensed by the temperature sensor in a second temperature measurement that occurs after the first temperature measurement; wherein the first temperature measurement occurs before the activation of the pump mechanism or during the activation of the pump mechanism; and wherein the second temperature measurement occurs during the activation of the pump mechanism or after the activation of the pump mechanism.

In a thirty third aspect, the invention resides in a method, which optionally incorporates one or more features of one or more of the first to thirty second aspects, wherein the determination as to whether the fluid has been dispensed is based at least in part on whether the temperature of the external surface presented by the drip tray as sensed by the temperature sensor in the second temperature measurement is lower by at least a threshold amount in comparison to the temperature of the external surface presented by the drip tray as sensed by the temperature sensor in the first temperature measurement.

In a thirty fourth aspect, the invention resides in a method, which optionally incorporates one or more features of one or more of the first to thirty third aspects, further comprising: determining a volume of the fluid that has been dispensed from the fluid dispenser based at least in part on the temperature of the external surface presented by the drip tray.

In a thirty fifth aspect, the invention resides in a method, which optionally incorporates one or more features of one or more of the first to thirty fourth aspects, wherein the fluid dispenser has an electronic pump activation mechanism for activating the pump mechanism, the method further comprising: using the electronic pump activation mechanism to activate the pump mechanism in a first activation time period; determining, based at least in part on the temperature of the external surface presented by the drip tray, whether the fluid has been dispensed in the first activation time period; and if the determination is made that no fluid was dispensed in the first activation time period, repeatedly using the electronic pump activation mechanism to activate the pump mechanism in subsequent activation time periods until a stop condition is satisfied.

In a thirty sixth aspect, the invention resides in a method, which optionally incorporates one or more features of one or more of the first to thirty fifth aspects, wherein satisfying the stop condition requires, at least in part, at least one of: determining that the fluid has been dispensed based at least in part on the temperature of the external surface presented by the drip tray; and determining that a quantity of the activations of the pump mechanism exceeds a threshold activation quantity.

In a thirty seventh aspect, the invention resides in a method, which optionally incorporates one or more features of one or more of the first to thirty sixth aspects, wherein using the electronic pump activation mechanism to activate the pump mechanism in the first activation time period comprises using the electronic pump activation mechanism to activate the pump mechanism when a trigger condition is satisfied.

In a thirty eighth aspect, the invention resides in a method, which optionally incorporates one or more features of one or more of the first to thirty seventh aspects, wherein satisfying the trigger condition requires, at least in part, at least one of: detecting a user; determining that a threshold time interval has passed since the pump mechanism was last activated; and determining that a scheduled activation time has arrived.

In a thirty ninth aspect, the invention resides in a fluid dispenser, which optionally incorporates one or more features of one or more of the first to twenty eighth aspects, comprising: a temperature sensor that senses a temperature of an external surface presented by a user's hand; a pump mechanism that is configured to dispense fluid onto the user's hand when the pump mechanism is activated; and a processor that determines, based at least in part on the temperature of the external surface presented by the user's hand, whether the fluid has been dispensed onto the user's hand.

In a fortieth aspect, the invention resides in a fluid dispenser, which optionally incorporates one or more features of one or more of the first to thirty ninth aspects, comprising: a drip tray; a temperature sensor that senses a temperature of an external surface presented by the drip tray; a fluid outlet that is positioned above the drip tray; a pump mechanism that is configured to dispense fluid from the fluid outlet when the pump mechanism is activated; and a processor that determines, based at least in part on the temperature of the external surface presented by the drip tray, whether the fluid has been dispensed.

In a forty first aspect, the invention resides in a smart cover for a fluid dispenser, which optionally incorporates one or more features of one or more of the first to fortieth aspects, the smart cover comprising: a temperature sensor that senses a temperature of an external surface presented by a user's hand; and a processor that determines, based at least in part on the temperature of the external surface presented by the user's hand, whether fluid has been dispensed from the fluid dispenser onto the user's hand.

In a forty second aspect, the invention resides in a smart cover for a fluid dispenser, which optionally incorporates one or more features of one or more of the first to forty first aspects, the smart cover comprising: a temperature sensor that senses a temperature of an external surface presented by a drip tray; and a processor that determines, based at least in part on the temperature of the external surface presented by the drip tray, whether fluid has been dispensed from the fluid dispenser.

In a forty third aspect, the invention resides in a smart cover for a fluid dispenser, which optionally incorporates one or more features of one or more of the first to forty second aspects, wherein the smart cover is removable from the fluid dispenser.

In a forty fourth aspect, the invention resides in a method, which optionally incorporates one or more features of one or more of the first to forty third aspects, comprising: providing a fluid dispenser having a temperature sensor that senses a temperature of an external surface presented by a user's hand, and a pump mechanism that is configured to dispense fluid onto the user's hand when the pump mechanism is activated; using the temperature sensor to sense the temperature of the external surface presented by the user's hand; and determining, based at least in part on the temperature of the external surface presented by the user's hand, whether the fluid has been dispensed onto the user's hand.

In a forty fifth aspect, the invention resides in a method, which optionally incorporates one or more features of one or more of the first to forty fourth aspects, wherein the temperature sensor is used to sense the temperature of the external surface presented by the user's hand at least one of during the activation of the pump mechanism; and after the activation of the pump mechanism.

In a forty sixth aspect, the invention resides in a method, which optionally incorporates one or more features of one or more of the first to forty fifth aspects, wherein the determination as to whether the fluid has been dispensed onto the user's hand is based at least in part on the temperature of the external surface presented by the user's hand as sensed by the temperature sensor at least one of; during the activation of the pump mechanism; and after the activation of the pump mechanism.

In a forty seventh aspect, the invention resides in a method, which optionally incorporates one or more features of one or more of the first to forty sixth aspects, wherein the temperature sensor senses the temperature of the external surface presented by the user's hand over time; and wherein the determination as to whether the fluid has been dispensed onto the user's hand is based at least in part on the temperature of the external surface presented by the user's hand as sensed by the temperature sensor over time.

In a forty eighth aspect, the invention resides in a method, which optionally incorporates one or more features of one or more of the first to forty seventh aspects, wherein the determination as to whether the fluid has been dispensed onto the user's hand is based at least in part on whether the temperature sensor senses a decrease in the temperature of the external surface presented by the user's hand over time.

In a forty ninth aspect, the invention resides in a method, which optionally incorporates one or more features of one or more of the first to forty eighth aspects, wherein the determination as to whether the fluid has been dispensed onto the user's hand is based at least in part on a comparison between the temperature of the external surface presented by the user's hand as sensed by the temperature sensor in a first temperature measurement, and the temperature of the external surface presented by the user's hand as sensed by the temperature sensor in a second temperature measurement that occurs after the first temperature measurement; wherein the first temperature measurement occurs before the activation of the pump mechanism or during the activation of the pump mechanism; and wherein the second temperature measurement occurs during the activation of the pump mechanism or after the activation of the pump mechanism.

In a fiftieth aspect, the invention resides in a method, which optionally incorporates one or more features of one or more of the first to forty ninth aspects, wherein the determination as to whether the fluid has been dispensed onto the user's hand is based at least in part on whether the temperature of the external surface presented by the user's hand as sensed by the temperature sensor in the second temperature measurement is lower than the temperature of the external surface presented by the user's hand as sensed by the temperature sensor in the first temperature measurement.

In a fifty first aspect, the invention resides in a method, which optionally incorporates one or more features of one or more of the first to fiftieth aspects, wherein the determination as to whether the fluid has been dispensed onto the user's hand is based at least in part on whether the temperature of the external surface presented by the user's hand as sensed by the temperature sensor in the second temperature measurement is lower by at least a threshold amount in comparison to the temperature of the external surface presented by the user's hand as sensed by the temperature sensor in the first temperature measurement.

In a fifty second aspect, the invention resides in a method, which optionally incorporates one or more features of one or more of the first to fifty first aspects, further comprising: determining a volume of the fluid that has been dispensed from the fluid dispenser; wherein the determination of the volume of the fluid that has been dispensed from the fluid dispenser is based at least in part on the determination as to whether the fluid has been dispensed onto the user's hand.

In a fifty third aspect, the invention resides in a method, which optionally incorporates one or more features of one or more of the first to fifty second aspects, wherein determining the volume of the fluid that has been dispensed from the fluid dispenser comprises: determining that the volume of the fluid that has been dispensed from the fluid dispenser has increased if the pump mechanism is activated and the determination is made that the fluid has been dispensed onto the user's hand based at least in part on the temperature of the external surface presented by the user's hand.

In a fifty fourth aspect, the invention resides in a method, which optionally incorporates one or more features of one or more of the first to fifty third aspects, wherein determining the volume of the fluid that has been dispensed from the fluid dispenser comprises: determining that the volume of the fluid that has been dispensed from the fluid dispenser remains unchanged if the pump mechanism is activated and the determination is made that no fluid has been dispensed onto the user's hand based at least in part on the temperature of the external surface presented by the user's hand.

In a fifty fifth aspect, the invention resides in a method, which optionally incorporates one or more features of one or more of the first to fifty fourth aspects, wherein determining the volume of the fluid that has been dispensed from the fluid dispenser comprises determining the volume of the fluid that has been dispensed from the fluid dispenser with each activation of the pump mechanism.

In a fifty sixth aspect, the invention resides in a method, which optionally incorporates one or more features of one or more of the first to fifty fifth aspects, wherein determining the volume of the fluid that has been dispensed from the fluid dispenser comprises determining the volume of the fluid that has been dispensed from the fluid dispenser during a user interaction with the dispenser, wherein the user interaction includes one or more activations of the pump mechanism.

In a fifty seventh aspect, the invention resides in a method, which optionally incorporates one or more features of one or more of the first to fifty sixth aspects, further comprising determining whether the volume of the fluid that has been dispensed from the fluid dispenser during the user interaction is equal to or greater than a threshold volume.

In a fifty eighth aspect, the invention resides in a method, which optionally incorporates one or more features of one or more of the first to fifty seventh aspects, further comprising: if the volume of the fluid that has been dispensed from the fluid dispenser during the user interaction is equal to or greater than the threshold volume, providing an indication that the volume of the fluid that has been dispensed from the fluid dispenser during the user interaction is equal to or greater than the threshold volume.

In a fifty ninth aspect, the invention resides in a method, which optionally incorporates one or more features of one or more of the first to fifty eighth aspects, wherein providing the indication that the volume of the fluid that has been dispensed from the fluid dispenser during the user interaction is equal to or greater than the threshold volume comprises changing an illumination state of an indicator light.

In a sixtieth aspect, the invention resides in a method, which optionally incorporates one or more features of one or more of the first to fifty ninth aspects, further comprising: if the volume of the fluid that has been dispensed from the fluid dispenser during the user interaction is less than the threshold volume, providing an indication that the volume of the fluid that has been dispensed from the fluid dispenser during the user interaction is less than the threshold volume.

In a sixty first aspect, the invention resides in a method, which optionally incorporates one or more features of one or more of the first to sixtieth aspects, wherein providing the indication that the volume of the fluid that has been dispensed from the fluid dispenser during the user interaction is less than the threshold volume comprises changing an illumination state of an indicator light.

In a sixty second aspect, the invention resides in a method, which optionally incorporates one or more features of one or more of the first to sixty first aspects, further comprising determining that the user interaction has begun based at least in part on at least one of: detection of a user by a user sensor; detection of the user's hand by a hand sensor; and detection of the activation of the pump mechanism by a pump activation sensor.

In a sixty third aspect, the invention resides in a method, which optionally incorporates one or more features of one or more of the first to sixty second aspects, further comprising determining that the user interaction has ended based at least in part on at least one of: detection data from the user sensor indicating that the user has moved away from the fluid dispenser; detection data from the hand sensor indicating that the user's hand has moved away from the fluid dispenser; and timer data indicating that a threshold amount of time has passed since at least one of: the user was detected by the user sensor; the user's hand was detected by the hand sensor; and the pump mechanism was activated.

In a sixty fourth aspect, the invention resides in a method, which optionally incorporates one or more features of one or more of the first to sixty third aspects, wherein the fluid dispenser further comprises a fluid reservoir for containing the fluid to be dispensed; and wherein determining the volume of the fluid that has been dispensed from the fluid dispenser comprises determining the volume of the fluid that has been dispensed from the fluid dispenser during a reservoir usage period, the reservoir usage period comprising a time period that commences when the fluid reservoir is installed or is refilled with the fluid, and ends when the fluid reservoir is replaced or is subsequently refilled.

In a sixty fifth aspect, the invention resides in a method, which optionally incorporates one or more features of one or more of the first to sixty fourth aspects, further comprising determining whether the volume of the fluid that has been dispensed from the fluid dispenser during the reservoir usage period is equal to or greater than a reservoir threshold volume.

In a sixty sixth aspect, the invention resides in a method, which optionally incorporates one or more features of one or more of the first to sixty fifth aspects, further comprising: if the volume of the fluid that has been dispensed from the fluid dispenser during the reservoir usage period is equal to or greater than the reservoir threshold volume, providing an indication that the volume of the fluid that has been dispensed from the fluid dispenser during the reservoir usage period is equal to or greater than the reservoir threshold volume.

In a sixty seventh aspect, the invention resides in a method, which optionally incorporates one or more features of one or more of the first to sixty sixth aspects, wherein providing the indication that the volume of the fluid that has been dispensed from the fluid dispenser during the reservoir usage period is equal to or greater than the reservoir threshold volume comprises at least one of: changing an illumination state of an indicator light; and generating an alert indicating that the fluid reservoir needs to be replaced or refilled.

In a sixty eighth aspect, the invention resides in a method, which optionally incorporates one or more features of one or more of the first to sixty seventh aspects, further comprising monitoring the volume of the fluid that has been dispensed from the fluid dispenser over time using a usage monitoring system.

In a sixty ninth aspect, the invention resides in a method, which optionally incorporates one or more features of one or more of the first to sixty eighth aspects, further comprising recording each instance in which the pump mechanism was activated and the determination was made that no fluid was dispensed onto the user's hand.

In a seventieth aspect, the invention resides in a method, which optionally incorporates one or more features of one or more of the first to sixty ninth aspects, further comprising monitoring over time the instances in which the pump mechanism was activated and the determination was made that no fluid was dispensed onto the user's hand using a dispenser monitoring system.

In a seventy first aspect, the invention resides in a method, which optionally incorporates one or more features of one or more of the first to seventieth aspects, further comprising determining whether a quantity of the instances in which the pump mechanism was activated and the determination was made that no fluid was dispensed onto the user's hand exceeds a threshold quantity.

In a seventy second aspect, the invention resides in a method, which optionally incorporates one or more features of one or more of the first to seventy first aspects, wherein the threshold quantity comprises at least one of: a number of the activations of the pump mechanism in a row in which the determination was made that no fluid was dispensed onto the user's hand; a number of the activations of the pump mechanism over a time period in which the determination was made that no fluid was dispensed onto the user's hand; and a percentage of the activations of the pump mechanism in which the determination was made that no fluid was dispensed onto the user's hand.

In a seventy third aspect, the invention resides in a method, which optionally incorporates one or more features of one or more of the first to seventy second aspects, further comprising: if the quantity of the instances in which the pump mechanism was activated and the determination was made that no fluid was dispensed onto the user's hand exceeds the threshold quantity, providing an indication that the quantity of the instances in which the pump mechanism was activated and the determination was made that no fluid was dispensed onto the user's hand exceeds the threshold quantity.

In a seventy fourth aspect, the invention resides in a method, which optionally incorporates one or more features of one or more of the first to seventy third aspects, wherein providing the indication that the quantity of the instances in which the pump mechanism was activated and the determination was made that no fluid was dispensed onto the user's hand exceeds the threshold quantity comprises at least one of: providing an out of order message; and generating an alert indicating that the fluid dispenser requires service.

In a seventy fifth aspect, the invention resides in a method, which optionally incorporates one or more features of one or more of the first to seventy fourth aspects, wherein the fluid dispenser has an electronic pump activation mechanism for activating the pump mechanism, the method further comprising: using the electronic pump activation mechanism to activate the pump mechanism in a first activation time period; determining, based at least in part on the temperature of the external surface presented by the user's hand, whether the fluid has been dispensed onto the user's hand in the first activation time period; and if the determination is made that no fluid was dispensed onto the user's hand in the first activation time period, repeatedly using the electronic pump activation mechanism to activate the pump mechanism in subsequent activation time periods until a stop condition is satisfied.

In a seventy sixth aspect, the invention resides in a method, which optionally incorporates one or more features of one or more of the first to seventy fifth aspects, wherein satisfying the stop condition requires, at least in part, at least one of: determining that the fluid has been dispensed onto the user's hand based at least in part on the temperature of the external surface presented by the user's hand; determining that a threshold dose of the fluid has been dispensed from the fluid dispenser; and determining that a quantity of the activations of the pump mechanism exceeds a threshold activation quantity.

In a seventy seventh aspect, the invention resides in a method, which optionally incorporates one or more features of one or more of the first to seventy sixth aspects, comprising: providing a fluid dispenser having a temperature sensor that senses a temperature of an external surface presented by a drip tray, and a pump mechanism that is configured to dispense fluid when the pump mechanism is activated; using the temperature sensor to sense the temperature of the external surface presented by the drip tray; and determining, based at least in part on the temperature of the external surface presented by the drip tray, whether the fluid has been dispensed.

In a seventy eighth aspect, the invention resides in a method, which optionally incorporates one or more features of one or more of the first to seventy seventh aspects, wherein the temperature sensor is used to sense the temperature of the external surface presented by the drip tray at least one of: during the activation of the pump mechanism; and after the activation of the pump mechanism.

In a seventy ninth aspect, the invention resides in a method, which optionally incorporates one or more features of one or more of the first to seventy eighth aspects, wherein the determination as to whether the fluid has been dispensed is based at least in part on the temperature of the external surface presented by the drip tray as sensed by the temperature sensor at least one of: during the activation of the pump mechanism; and after the activation of the pump mechanism.

In an eightieth aspect, the invention resides in a method, which optionally incorporates one or more features of one or more of the first to seventy ninth aspects, wherein the temperature sensor senses the temperature of the external surface presented by the drip tray over time; and wherein the determination as to whether the fluid has been dispensed is based at least in part on the temperature of the external surface presented by the drip tray as sensed by the temperature sensor over time.

In an eighty first aspect, the invention resides in a method, which optionally incorporates one or more features of one or more of the first to eightieth aspects, wherein the determination as to whether the fluid has been dispensed is based at least in part on whether the temperature sensor senses a decrease in the temperature of the external surface presented by the drip tray over time.

In an eighty second aspect, the invention resides in a method, which optionally incorporates one or more features of one or more of the first to eighty first aspects, wherein the determination as to whether the fluid has been dispensed is based at least in part on a comparison between the temperature of the external surface presented by the drip tray as sensed by the temperature sensor in a first temperature measurement, and the temperature of the external surface presented by the drip tray as sensed by the temperature sensor in a second temperature measurement that occurs after the first temperature measurement; wherein the first temperature measurement occurs before the activation of the pump mechanism or during the activation of the pump mechanism; and wherein the second temperature measurement occurs during the activation of the pump mechanism or after the activation of the pump mechanism.

In an eighty third aspect, the invention resides in a method, which optionally incorporates one or more features of one or more of the first to eighty second aspects, wherein the determination as to whether the fluid has been dispensed is based at least in part on whether the temperature of the external surface presented by the drip tray as sensed by the temperature sensor in the second temperature measurement is lower than the temperature of the external surface presented by the drip tray as sensed by the temperature sensor in the first temperature measurement.

In an eighty fourth aspect, the invention resides in a method, which optionally incorporates one or more features of one or more of the first to eighty third aspects, wherein the determination as to whether the fluid has been dispensed is based at least in part on whether the temperature of the external surface presented by the drip tray as sensed by the temperature sensor in the second temperature measurement is lower by at least a threshold amount in comparison to the temperature of the external surface presented by the drip tray as sensed by the temperature sensor in the first temperature measurement.

In an eighty fifth aspect, the invention resides in a method, which optionally incorporates one or more features of one or more of the first to eighty fourth aspects, further comprising: determining a volume of the fluid that has been dispensed from the fluid dispenser; wherein the determination of the volume of the fluid that has been dispensed from the fluid dispenser is based at least in part on the determination as to whether the fluid has been dispensed.

In an eighty sixth aspect, the invention resides in a method, which optionally incorporates one or more features of one or more of the first to eighty fifth aspects, wherein determining the volume of the fluid that has been dispensed from the fluid dispenser comprises: determining that the volume of the fluid that has been dispensed from the fluid dispenser has increased if the pump mechanism is activated and the determination is made that the fluid has been dispensed based at least in part on the temperature of the external surface presented by the drip tray.

In an eighty seventh aspect, the invention resides in a method, which optionally incorporates one or more features of one or more of the first to eighty sixth aspects, wherein determining the volume of the fluid that has been dispensed from the fluid dispenser comprises: determining that the volume of the fluid that has been dispensed from the fluid dispenser remains unchanged if the pump mechanism is activated and the determination is made that no fluid has been dispensed based at least in part on the temperature of the external surface presented by the drip tray.

In an eighty eighth aspect, the invention resides in a method, which optionally incorporates one or more features of one or more of the first to eighty seventh aspects, wherein determining the volume of the fluid that has been dispensed from the fluid dispenser comprises determining the volume of the fluid that has been dispensed from the fluid dispenser with each activation of the pump mechanism.

In an eighty ninth aspect, the invention resides in a method, which optionally incorporates one or more features of one or more of the first to eighty eighth aspects, wherein the fluid dispenser further comprises a fluid reservoir for containing the fluid to be dispensed; and wherein determining the volume of the fluid that has been dispensed from the fluid dispenser comprises determining the volume of the fluid that has been dispensed from the fluid dispenser during a reservoir usage period, the reservoir usage period comprising a time period that commences when the fluid reservoir is installed or is refilled with the fluid, and ends when the fluid reservoir is replaced or is subsequently refilled.

In a ninetieth aspect, the invention resides in a method, which optionally incorporates one or more features of one or more of the first to eighty ninth aspects, further comprising determining whether the volume of the fluid that has been dispensed from the fluid dispenser during the reservoir usage period is equal to or greater than a reservoir threshold volume.

In a ninety first aspect, the invention resides in a method, which optionally incorporates one or more features of one or more of the first to ninetieth aspects, further comprising: if the volume of the fluid that has been dispensed from the fluid dispenser during the reservoir usage period is equal to or greater than the reservoir threshold volume, providing an indication that the volume of the fluid that has been dispensed from the fluid dispenser during the reservoir usage period is equal to or greater than the reservoir threshold volume.

In a ninety second aspect, the invention resides in a method, which optionally incorporates one or more features of one or more of the first to ninety first aspects, wherein providing the indication that the volume of the fluid that has been dispensed from the fluid dispenser during the reservoir usage period is equal to or greater than the reservoir threshold volume comprises at least one of: changing an illumination state of an indicator light; and generating an alert indicating that the fluid reservoir needs to be replaced or refilled.

In a ninety third aspect, the invention resides in a method, which optionally incorporates one or more features of one or more of the first to ninety second aspects, further comprising monitoring the volume of the fluid that has been dispensed from the fluid dispenser over time using a usage monitoring system.

In a ninety fourth aspect, the invention resides in a method, which optionally incorporates one or more features of one or more of the first to ninety third aspects, further comprising recording each instance in which the pump mechanism was activated and the determination was made that no fluid was dispensed.

In a ninety fifth aspect, the invention resides in a method, which optionally incorporates one or more features of one or more of the first to ninety fourth aspects, further comprising monitoring over time the instances in which the pump mechanism was activated and the determination was made that no fluid was dispensed using a dispenser monitoring system.

In a ninety sixth aspect, the invention resides in a method, which optionally incorporates one or more features of one or more of the first to ninety fifth aspects, further comprising determining whether a quantity of the instances in which the pump mechanism was activated and the determination was made that no fluid was dispensed exceeds a threshold quantity.

In a ninety seventh aspect, the invention resides in a method, which optionally incorporates one or more features of one or more of the first to ninety sixth aspects, wherein the threshold quantity comprises at least one of: a number of the activations of the pump mechanism in a row in which the determination was made that no fluid was dispensed; a number of the activations of the pump mechanism over a time period in which the determination was made that no fluid was dispensed; and a percentage of the activations of the pump mechanism in which the determination was made that no fluid was dispensed.

In a ninety eighth aspect, the invention resides in a method, which optionally incorporates one or more features of one or more of the first to ninety seventh aspects, further comprising: if the quantity of the instances in which the pump mechanism was activated and the determination was made that no fluid was dispensed exceeds the threshold quantity, providing an indication that the quantity of the instances in which the pump mechanism was activated and the determination was made that no fluid was dispensed exceeds the threshold quantity.

In a ninety ninth aspect, the invention resides in a method, which optionally incorporates one or more features of one or more of the first to ninety eighth aspects, wherein providing the indication that the quantity of the instances in which the pump mechanism was activated and the determination was made that no fluid was dispensed exceeds the threshold quantity comprises at least one of: providing an out of order message; and generating an alert indicating that the fluid dispenser requires service.

In a one hundredth aspect, the invention resides in a method, which optionally incorporates one or more features of one or more of the first to ninety ninth aspects, wherein the fluid dispenser has an electronic pump activation mechanism for activating the pump mechanism, the method further comprising: using the electronic pump activation mechanism to activate the pump mechanism in a first activation time period; determining, based at least in part on the temperature of the external surface presented by the drip tray, whether the fluid has been dispensed in the first activation time period; and if the determination is made that no fluid was dispensed in the first activation time period, repeatedly using the electronic pump activation mechanism to activate the pump mechanism in subsequent activation time periods until a stop condition is satisfied.

In a one hundred and first aspect, the invention resides in a method, which optionally incorporates one or more features of one or more of the first to one hundredth aspects, wherein satisfying the stop condition requires, at least in part, at least one of: determining that the fluid has been dispensed based at least in part on the temperature of the external surface presented by the drip tray; and determining that a quantity of the activations of the pump mechanism exceeds a threshold activation quantity.

In a one hundred and second aspect, the invention resides in a method, which optionally incorporates one or more features of one or more of the first to one hundred and first aspects, wherein using the electronic pump activation mechanism to activate the pump mechanism in the first activation time period comprises using the electronic pump activation mechanism to activate the pump mechanism when a trigger condition is satisfied.

In a one hundred and third aspect, the invention resides in a method, which optionally incorporates one or more features of one or more of the first to one hundred and second aspects, wherein satisfying the trigger condition requires, at least in part, at least one of: detecting a user; determining that a threshold time interval has passed since the pump mechanism was last activated; and determining that a scheduled activation time has arrived.

In a one hundred and fourth aspect, the invention resides in a fluid dispenser, which optionally incorporates one or more features of one or more of the first to one hundred and third aspects, comprising: a temperature sensor that senses a temperature of an external surface presented by a user's hand; a pump mechanism that is configured to dispense fluid onto the user's hand when the pump mechanism is activated; and a processor that determines, based at least in part on the temperature of the external surface presented by the user's hand, whether the fluid has been dispensed onto the user's hand.

In a one hundred and fifth aspect, the invention resides in a fluid dispenser, which optionally incorporates one or more features of one or more of the first to one hundred and fourth aspects, comprising: a drip tray; a temperature sensor that senses a temperature of an external surface presented by the drip tray; a fluid outlet that is positioned above the drip tray; a pump mechanism that is configured to dispense fluid from the fluid outlet when the pump mechanism is activated; and a processor that determines, based at least in part on the temperature of the external surface presented by the drip tray, whether the fluid has been dispensed.

In a one hundred and sixth aspect, the invention resides in a smart cover for a fluid dispenser, which optionally incorporates one or more features of one or more of the first to one hundred and fifth aspects, the smart cover comprising: a temperature sensor that senses a temperature of an external surface presented by a user's hand; and a processor that determines, based at least in part on the temperature of the external surface presented by the user's hand, whether fluid has been dispensed from the fluid dispenser onto the user's hand.

In a one hundred and seventh aspect, the invention resides in a smart cover for a fluid dispenser, which optionally incorporates one or more features of one or more of the first to one hundred and sixth aspects, the smart cover comprising: a temperature sensor that senses a temperature of an external surface presented by a drip tray; and a processor that determines, based at least in part on the temperature of the external surface presented by the drip tray, whether fluid has been dispensed from the fluid dispenser.

In a one hundred and eighth aspect, the invention resides in a smart cover, which optionally incorporates one or more features of one or more of the first to one hundred and seventh aspects, wherein the smart cover is removable from the fluid dispenser.

In a one hundred and ninth aspect, the invention resides in a method, which optionally incorporates one or more features of one or more of the first to one hundred and eighth aspects, further comprising determining an operational status of the fluid dispenser based at least in part on the determination as to whether the fluid has been dispensed.

In a one hundred and tenth aspect, the invention resides in a method, which optionally incorporates one or more features of one or more of the first to one hundred and ninth aspects, wherein the operational status comprises one or more of: i) whether the pump mechanism needs to be primed; ii) whether a fluid reservoir of the fluid dispenser is empty; iii) whether the fluid dispenser is malfunctioning; iv) whether the fluid dispenser requires service; and v) whether the pump mechanism is leaking.

In a one hundred and eleventh aspect, the invention resides in a method, which optionally incorporates one or more features of one or more of the first to one hundred and tenth aspects, further comprising providing an indication of the operational status.

In a one hundred and twelfth aspect, the invention resides in a method, which optionally incorporates one or more features of one or more of the first to one hundred and eleventh aspects, wherein providing the indication of the operational status comprises one or more of: illuminating a light; providing an alert; displaying a message; and transmitting an electronic signal.

In a one hundred and thirteenth aspect, the invention resides in a method, which optionally incorporates one or more features of one or more of the first to one hundred and twelfth aspects, further comprising determining whether a fluid reservoir of the fluid dispenser is empty based at least in part on the determination as to whether the fluid has been dispensed.

In a one hundred and fourteenth aspect, the invention resides in a method, which optionally incorporates one or more features of one or more of the first to one hundred and thirteenth aspects, further comprising providing an indication when the determination is made that the fluid reservoir is empty.

In a one hundred and fifteenth aspect, the invention resides in a method, which optionally incorporates one or more features of one or more of the first to one hundred and fourteenth aspects, further comprising determining whether the fluid dispenser is malfunctioning based at least in part on the determination as to whether the fluid has been dispensed.

In a one hundred and sixteenth aspect, the invention resides in a method, which optionally incorporates one or more features of one or more of the first to one hundred and fifteenth aspects, further comprising providing an indication when the determination is made that the fluid dispenser is malfunctioning.

In a one hundred and seventeenth aspect, the invention resides in a method, which optionally incorporates one or more features of one or more of the first to one hundred and sixteenth aspects, further comprising determining whether the fluid dispenser requires service based at least in part on the determination as to whether the fluid has been dispensed.

In a one hundred and eighteenth aspect, the invention resides in a method, which optionally incorporates one or more features of one or more of the first to one hundred and seventeenth aspects, further comprising providing an indication when the determination is made that the fluid dispenser requires service.

In a one hundred and nineteenth aspect, the invention resides in a method, which optionally incorporates one or more features of one or more of the first to one hundred and eighteenth aspects, wherein the fluid dispenser comprises a first fluid reservoir containing a first supply of the fluid and a second fluid reservoir containing a second supply of the fluid; the method further comprising: controlling the fluid dispenser to dispense the fluid from the first fluid reservoir; determining whether the first fluid reservoir is empty based at least in part on the determination as to whether the fluid has been dispensed; and upon determining that the first fluid reservoir is empty, controlling the fluid dispenser to dispense the fluid from the second fluid reservoir.

In a one hundred and twentieth aspect, the invention resides in a method, which optionally incorporates one or more features of one or more of the first to one hundred and nineteenth aspects, further comprising priming the pump mechanism for dispensing the fluid from the first fluid reservoir upon installation of the first fluid reservoir.

In a one hundred and twenty first aspect, the invention resides in a method, which optionally incorporates one or more features of one or more of the first to one hundred and twentieth aspects, further comprising priming the pump mechanism for dispensing the fluid from the second fluid reservoir upon determining that the first fluid reservoir is empty.

In a one hundred and twenty second aspect, the invention resides in a method, which optionally incorporates one or more features of one or more of the first to one hundred and twenty first aspects, wherein determining whether the first fluid reservoir is empty comprises: determining that the first fluid reservoir is empty if the determination is made that no fluid was dispensed from the fluid dispenser after at least one activation of the pump mechanism.

In a one hundred and twenty third aspect, the invention resides in a method, which optionally incorporates one or more features of one or more of the first to one hundred and twenty second aspects, wherein determining whether the first fluid reservoir is empty comprises: determining that the fluid was dispensed from the fluid dispenser after at least one activation of the pump mechanism; and determining that the first fluid reservoir is empty if the determination is made that no fluid was dispensed from the fluid dispenser after at least one subsequent activation of the pump mechanism.

In a one hundred and twenty fourth aspect, the invention resides in a method, which optionally incorporates one or more features of one or more of the first to one hundred and twenty third aspects, further comprising: upon determining that the first fluid reservoir is empty, providing an indication that the first fluid reservoir is empty.

In a one hundred and twenty fifth aspect, the invention resides in a method, which optionally incorporates one or more features of one or more of the first to one hundred and twenty fourth aspects, wherein providing the indication that the first fluid reservoir is empty comprises providing an alert to maintenance staff.

In a one hundred and twenty sixth aspect, the invention resides in a method, which optionally incorporates one or more features of one or more of the first to one hundred and twenty fifth aspects, further comprising: after determining that the first fluid reservoir is empty, replacing the first fluid reservoir with a third fluid reservoir containing a third supply of the fluid; determining whether the second fluid reservoir is empty based at least in part on the determination as to whether the fluid has been dispensed; and upon determining that the second fluid reservoir is empty, controlling the fluid dispenser to dispense the fluid from the third fluid reservoir.

In a one hundred and twenty seventh aspect, the invention resides in a fluid dispenser, which optionally incorporates one or more features of one or more of the first to one hundred and twenty sixth aspects, further comprising: a first fluid reservoir containing a first supply of the fluid; a second fluid reservoir containing a second supply of the fluid; and a controller that: controls the fluid dispenser to dispense the fluid from the first fluid reservoir; determines whether the first fluid reservoir is empty based at least in part on the determination as to whether the fluid has been dispensed; and upon determining that the first fluid reservoir is empty, controls the fluid dispenser to dispense the fluid from the second fluid reservoir.

In a one hundred and twenty eighth aspect, the invention resides in a method, which optionally incorporates one or more features of one or more of the first to one hundred and twenty seventh aspects, comprising: providing a fluid dispenser having a temperature sensor that senses a temperature of an external surface presented by a user's hand, and a pump mechanism that is configured to dispense fluid onto the user's hand when the pump mechanism is activated; using the temperature sensor to sense the temperature of the external surface presented by the user's hand; and determining, based at least in part on the temperature of the external surface presented by the user's hand, whether the fluid has been dispensed onto the user's hand.

In a one hundred and twenty ninth aspect, the invention resides in a method, which optionally incorporates one or more features of one or more of the first to one hundred and twenty eighth aspects, wherein the determination as to whether the fluid has been dispensed onto the user's hand is based at least in part on whether the temperature sensor senses a decrease in the temperature of the external surface presented by the user's hand over time.

In a one hundred and thirtieth aspect, the invention resides in a method, which optionally incorporates one or more features of one or more of the first to one hundred and twenty ninth aspects, further comprising determining an operational status of the fluid dispenser based at least in part on the determination as to whether the fluid has been dispensed.

In a one hundred and thirty first aspect, the invention resides in a method, which optionally incorporates one or more features of one or more of the first to one hundred and thirtieth aspects, wherein the operational status comprises one or more of: i) whether the pump mechanism needs to be primed; ii) whether a fluid reservoir of the fluid dispenser is empty; iii) whether the fluid dispenser is malfunctioning; and iv) whether the fluid dispenser requires service.

In a one hundred and thirty second aspect, the invention resides in a method, which optionally incorporates one or more features of one or more of the first to one hundred and thirty first aspects, further comprising providing an indication of the operational status; wherein providing the indication of the operational status comprises one or more of: illuminating a light; providing an alert; displaying a message; and transmitting a signal.

In a one hundred and thirty third aspect, the invention resides in a method, which optionally incorporates one or more features of one or more of the first to one hundred and thirty second aspects, further comprising determining whether a fluid reservoir of the fluid dispenser is empty based at least in part on the determination as to whether the fluid has been dispensed.

In a one hundred and thirty fourth aspect, the invention resides in a method, which optionally incorporates one or more features of one or more of the first to one hundred and thirty third aspects, further comprising providing an indication when the determination is made that the fluid reservoir is empty.

In a one hundred and thirty fifth aspect, the invention resides in a method, which optionally incorporates one or more features of one or more of the first to one hundred and thirty fourth aspects, further comprising determining whether the fluid dispenser is malfunctioning based at least in part on the determination as to whether the fluid has been dispensed.

In a one hundred and thirty sixth aspect, the invention resides in a method, which optionally incorporates one or more features of one or more of the first to one hundred and thirty fifth aspects, further comprising providing an indication when the determination is made that the fluid dispenser is malfunctioning.

In a one hundred and thirty seventh aspect, the invention resides in a method, which optionally incorporates one or more features of one or more of the first to one hundred and thirty sixth aspects, further comprising determining whether the fluid dispenser requires service based at least in part on the determination as to whether the fluid has been dispensed.

In a one hundred and thirty eighth aspect, the invention resides in a method, which optionally incorporates one or more features of one or more of the first to one hundred and thirty seventh aspects, further comprising providing an indication when the determination is made that the fluid dispenser requires service.

In a one hundred and thirty ninth aspect, the invention resides in a method, which optionally incorporates one or more features of one or more of the first to one hundred and thirty eighth aspects, wherein the fluid dispenser comprises a first fluid reservoir containing a first supply of the fluid and a second fluid reservoir containing a second supply of the fluid; the method further comprising: controlling the fluid dispenser to dispense the fluid from the first fluid reservoir; determining whether the first fluid reservoir is empty based at least in part on the determination as to whether the fluid has been dispensed; and upon determining that the first fluid reservoir is empty, controlling the fluid dispenser to dispense the fluid from the second fluid reservoir.

In a one hundred and fortieth aspect, the invention resides in a method, which optionally incorporates one or more features of one or more of the first to one hundred and thirty ninth aspects, wherein determining whether the first fluid reservoir is empty comprises: determining that the first fluid reservoir is empty if the determination is made that no fluid was dispensed from the fluid dispenser after at least one activation of the pump mechanism.

In a one hundred and forty first aspect, the invention resides in a method, which optionally incorporates one or more features of one or more of the first to one hundred and fortieth aspects, further comprising: upon determining that the first fluid reservoir is empty, providing an indication that the first fluid reservoir is empty; wherein providing the indication that the first fluid reservoir is empty comprises providing an alert to maintenance staff.

In a one hundred and forty second aspect, the invention resides in a method, which optionally incorporates one or more features of one or more of the first to one hundred and forty first aspects, further comprising: after determining that the first fluid reservoir is empty, replacing the first fluid reservoir with a third fluid reservoir containing a third supply of the fluid; determining whether the second fluid reservoir is empty based at least in part on the determination as to whether the fluid has been dispensed; and upon determining that the second fluid reservoir is empty, controlling the fluid dispenser to dispense the fluid from the third fluid reservoir.

In a one hundred and forty third aspect, the invention resides in a method, which optionally incorporates one or more features of one or more of the first to one hundred and forty second aspects, further comprising determining an operational status of the fluid dispenser based at least in part on the determination as to whether the fluid has been dispensed.

In a one hundred and forty fourth aspect, the invention resides in a method, which optionally incorporates one or more features of one or more of the first to one hundred and forty third aspects, wherein the operational status comprises one or more of: i) whether the pump mechanism needs to be primed; ii) whether a fluid reservoir of the fluid dispenser is empty; iii) whether the fluid dispenser is malfunctioning; and iv) whether the fluid dispenser requires service.

In a one hundred and forty fifth aspect, the invention resides in a method, which optionally incorporates one or more features of one or more of the first to one hundred and forty fourth aspects, further comprising providing an indication of the operational status; wherein providing the indication of the operational status comprises one or more of: illuminating a light; providing an alert; displaying a message; and transmitting a signal.

In a one hundred and forty sixth aspect, the invention resides in a method, which optionally incorporates one or more features of one or more of the first to one hundred and forty fifth aspects, further comprising determining whether a fluid reservoir of the fluid dispenser is empty based at least in part on the determination as to whether the fluid has been dispensed.

In a one hundred and forty seventh aspect, the invention resides in a method, which optionally incorporates one or more features of one or more of the first to one hundred and forty sixth aspects, wherein the fluid dispenser comprises a first fluid reservoir containing a first supply of the fluid and a second fluid reservoir containing a second supply of the fluid; the method further comprising: controlling the fluid dispenser to dispense the fluid from the first fluid reservoir; determining whether the first fluid reservoir is empty based at least in part on the determination as to whether the fluid has been dispensed; and upon determining that the first fluid reservoir is empty, controlling the fluid dispenser to dispense the fluid from the second fluid reservoir; wherein determining whether the first fluid reservoir is empty comprises: determining that the first fluid reservoir is empty if the determination is made that no fluid was dispensed from the fluid dispenser after at least one activation of the pump mechanism; the method further comprising: upon determining that the first fluid reservoir is empty, providing an indication that the first fluid reservoir is empty; wherein providing the indication that the first fluid reservoir is empty comprises providing an alert to maintenance staff; the method further comprising: after determining that the first fluid reservoir is empty, replacing the first fluid reservoir with a third fluid reservoir containing a third supply of the fluid; determining whether the second fluid reservoir is empty based at least in part on the determination as to whether the fluid has been dispensed; and upon determining that the second fluid reservoir is empty, controlling the fluid dispenser to dispense the fluid from the third fluid reservoir.

In a one hundred and forty eighth aspect, the present invention resides in a method, a fluid dispenser, and/or a smart cover that combines one or more of the features of one or more of the first to one hundred and forty seventh aspects with any one or more of the remaining features of any one or more of the first to one hundred and forty seventh aspects.

BRIEF DESCRIPTION OF THE DRAWINGS

Further aspects and advantages of the invention will appear from the following description taken together with the accompanying drawings, in which.

DETAILED DESCRIPTION OF THE DRAWINGS

FIGS. 1 to 5 show a fluid dispenser 10 in accordance with a first embodiment of the present invention. The fluid dispenser 10 has a construction generally similar to that shown and described in U.S. Pat. No. 7,748,573 to Anhuf et al., issued Jul. 6, 2010, which is incorporated herein by reference.

Figure 3:
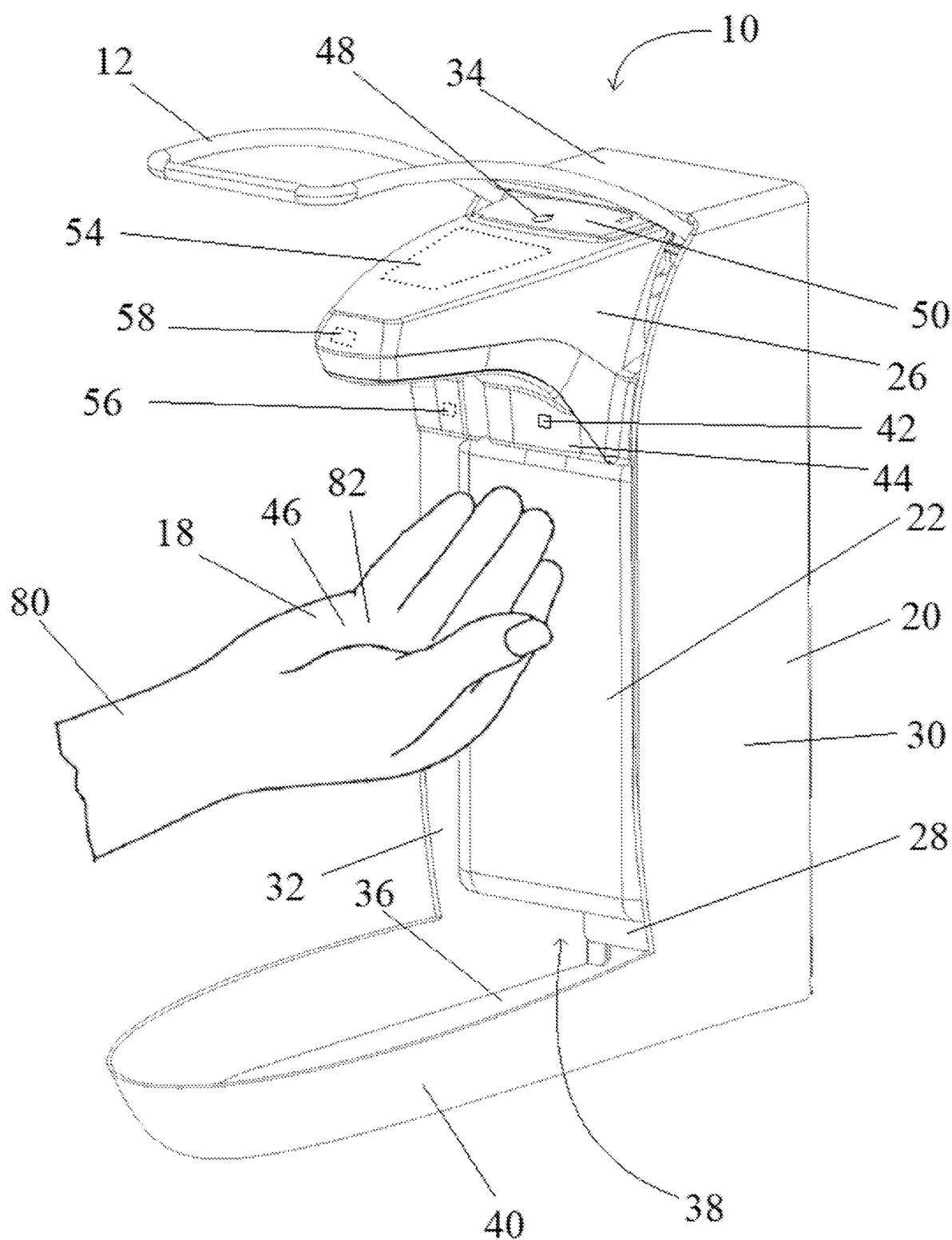
FIG. 3 is a perspective view of the fluid dispenser shown in FIG. 1, with a user's hand shown positioned below the smart cover and the actuator lever at the rest position.
Figure 5:
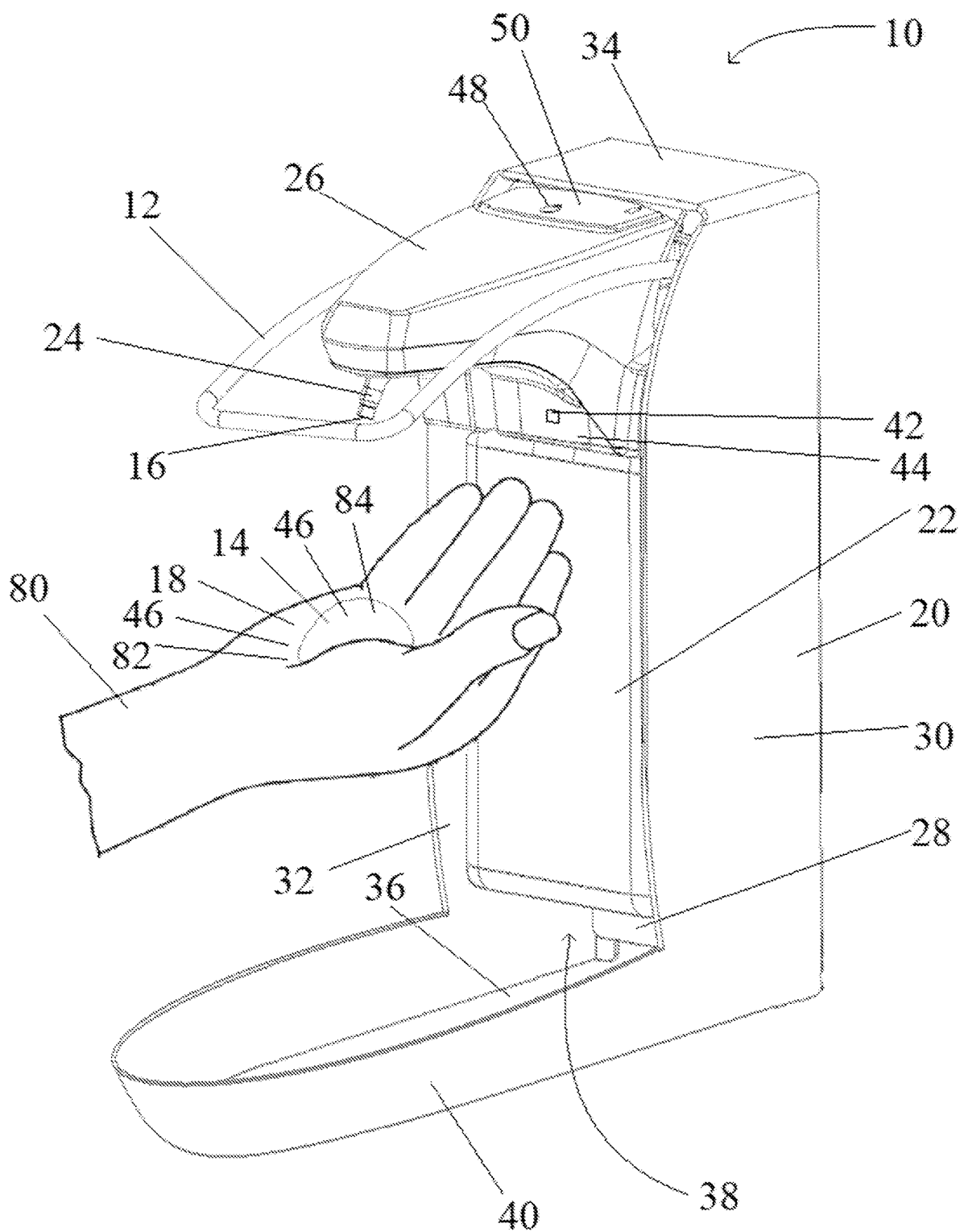
FIG. 5 is a perspective view of the fluid dispenser and the user's hand shown in FIG. 3, with the actuator lever at the depressed position and with a volume of fluid dispensed onto the user's hand.

The fluid dispenser 10 is adapted to be secured to a wall, not shown, and is adapted for manual activation by a user 80 urging an actuator lever 12 downwardly from the rest position shown in FIG. 3 to the depressed position shown in FIG. 5 so as to dispense hand cleaning fluid 14 from a fluid outlet 16 onto the user's hand 18.

Figure 4:
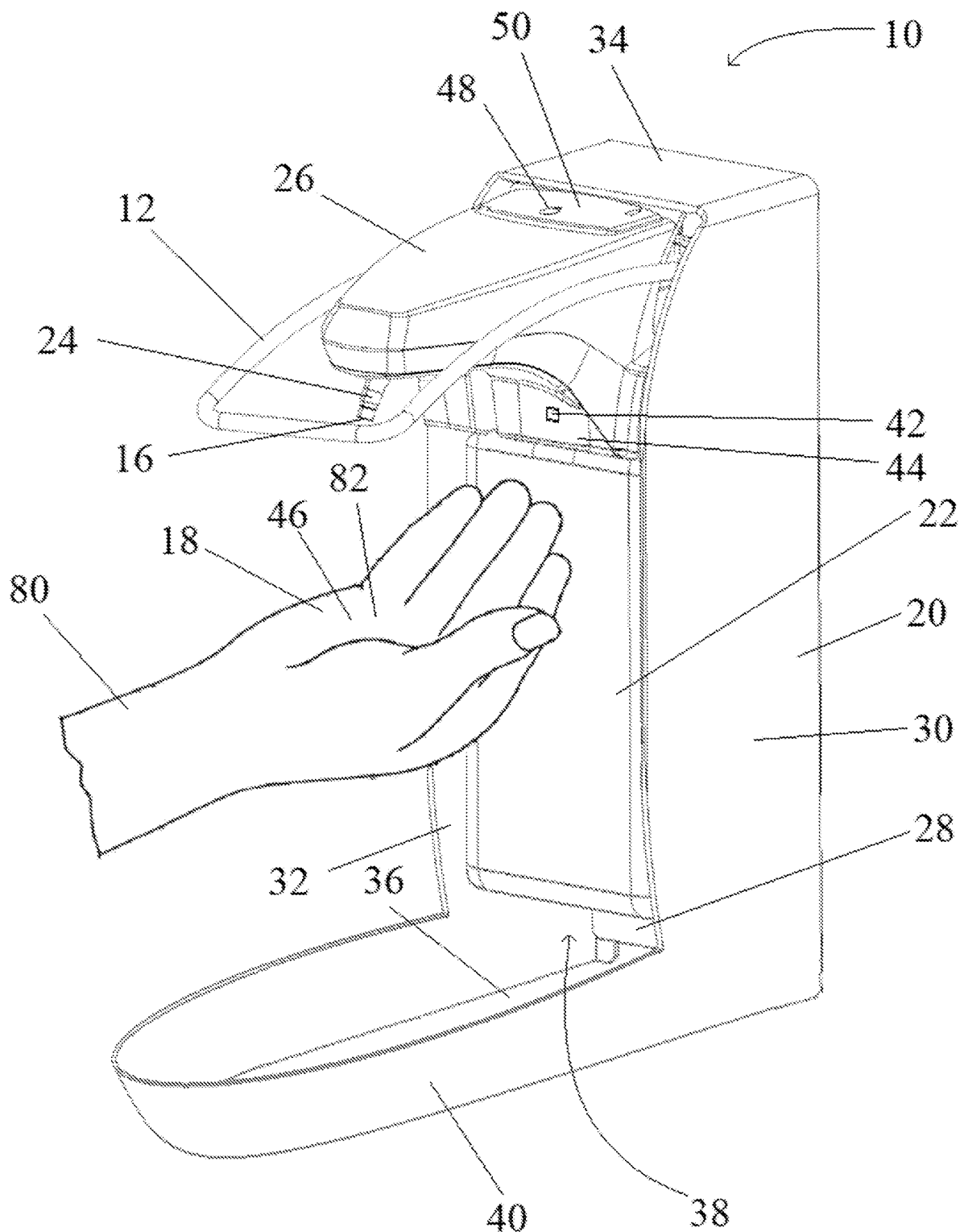
FIG. 4 is a perspective view of the fluid dispenser and the user's hand shown in FIG. 3, with the actuator lever at a depressed position and with no fluid dispensed onto the user's hand.

Referring to FIG. 4, the fluid dispenser 10 has a housing 20, a fluid reservoir 22, a pump mechanism 24, the actuator lever 12, and a smart cover 26. The housing 20 has a back plate 28, spaced side walls 30 and 32, a top wall 34, and a bottom wall 36 defining an interior cavity 38 therebetween. At the bottom of the housing 20, the side walls 30 and 32 and the bottom wall 36 extend forwardly to form a drip tray 40.

The fluid reservoir 22 is a plastic bottle that sits within the interior cavity 38 of the housing 20 and contains a supply of the hand cleaning fluid 14 to be dispensed from the dispenser 10. The hand cleaning fluid 14 may, for example, be hand sanitizer or hand soap. The reservoir 22 is supported for communication of the fluid 14 in the reservoir 22, such as by a ledge, not shown, carried by the back plate 28 of the housing 20, as is known in the art. The reservoir 22 may have any suitable structure, such as that shown and described in U.S. Pat. No. 7,748,573 to Anhuf et al., and is removable from the housing 20 so that it can be refilled or replaced when the supply of fluid 14 within the reservoir 22 is running low, as is described and shown in more detail in U.S. Pat. No. 7,748,573 to Anhuf et al.

The pump mechanism 24 is coupled to the fluid reservoir 22 for dispensing the fluid 14 contained in the fluid reservoir 22 out through the fluid outlet 16. The pump mechanism 24 may have any suitable structure, and may for example be in the form of a piston pump assembly as shown and described in U.S. Pat. No. 7,748,573 to Anhuf et al. The pump mechanism 24 is activated by depressing the actuator lever 12 from the rest position of FIG. 3 to the depressed position of FIG. 5, as is known in the art. When the pump mechanism 24 is primed and operating normally, an allotment of the fluid 14 is dispensed from the fluid outlet 16 upon activation of the pump mechanism 24.

The smart cover 26 is removably coupled to the housing 20 and has a similar structure to the nozzle shield shown and described in U.S. Pat. No. 7,748,573 to Anhuf et al. When coupled to the housing 20, the smart cover 26 substantially covers the pump mechanism 24, protecting the pump mechanism 24 from contamination and damage.

Figure 1:
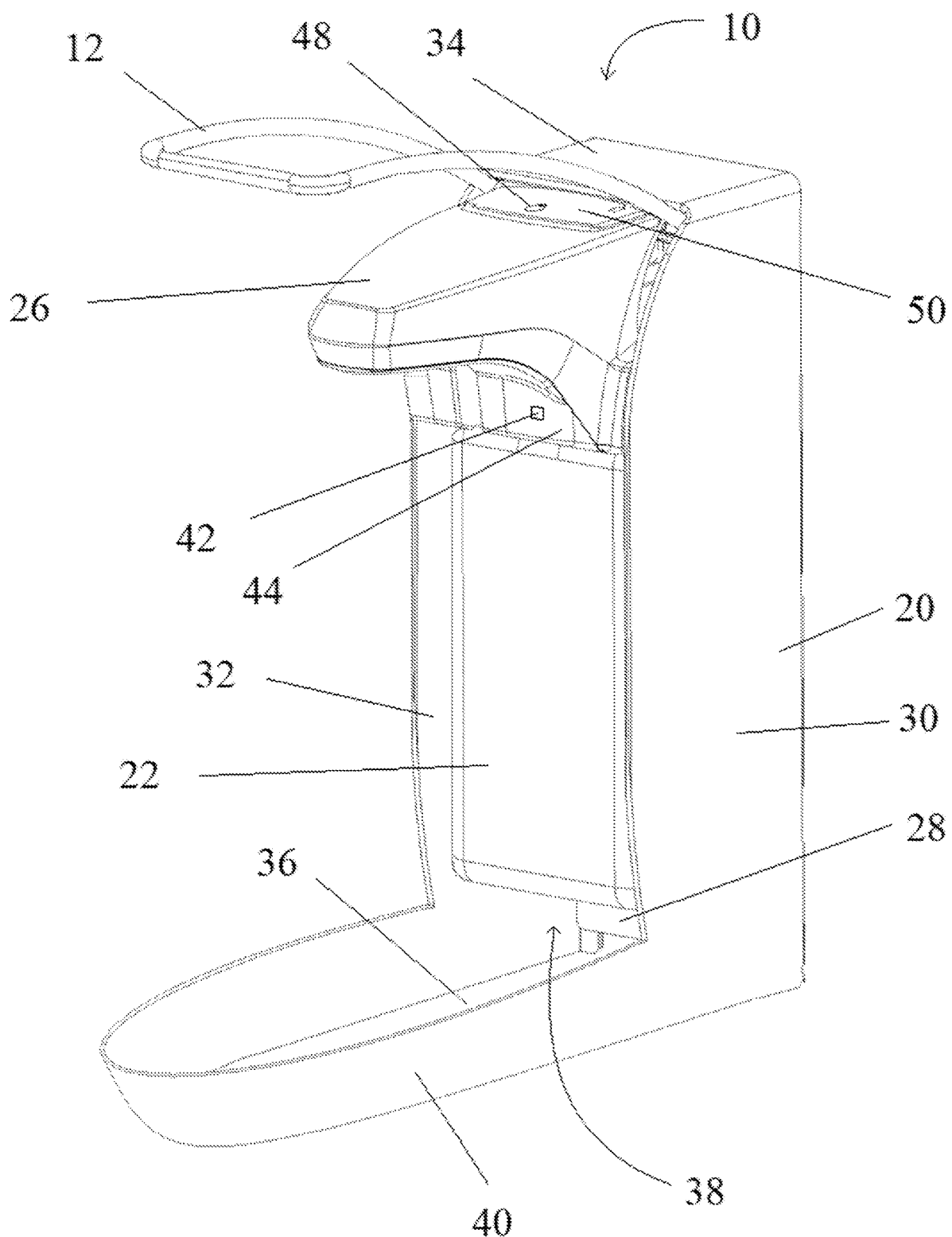
FIG. 1 is a perspective view of a fluid dispenser in accordance with a first embodiment of the present invention, showing an actuator lever of the dispenser at a rest position.

As can be seen in FIG. 1, the smart cover 26 has a temperature sensor 42 in the form of a contactless infrared thermometer that is positioned on a forwardly and downwardly facing front surface 44 of the smart cover 26. As shown in FIG. 4, the temperature sensor 42 faces the area below the fluid outlet 16, and is configured to detect the temperature of an external surface 46 presented by the user's hand 18 when the user's hand 18 is placed in the area below the fluid outlet 16.

An indicator light 48 is positioned on a top surface 50 of the smart cover 26, as shown in FIG. 1. The smart cover 26 also optionally includes a display screen 54, a hand sensor 56, and/or a user sensor 58, which are shown in dotted lines in FIG. 3.

Figure 2:
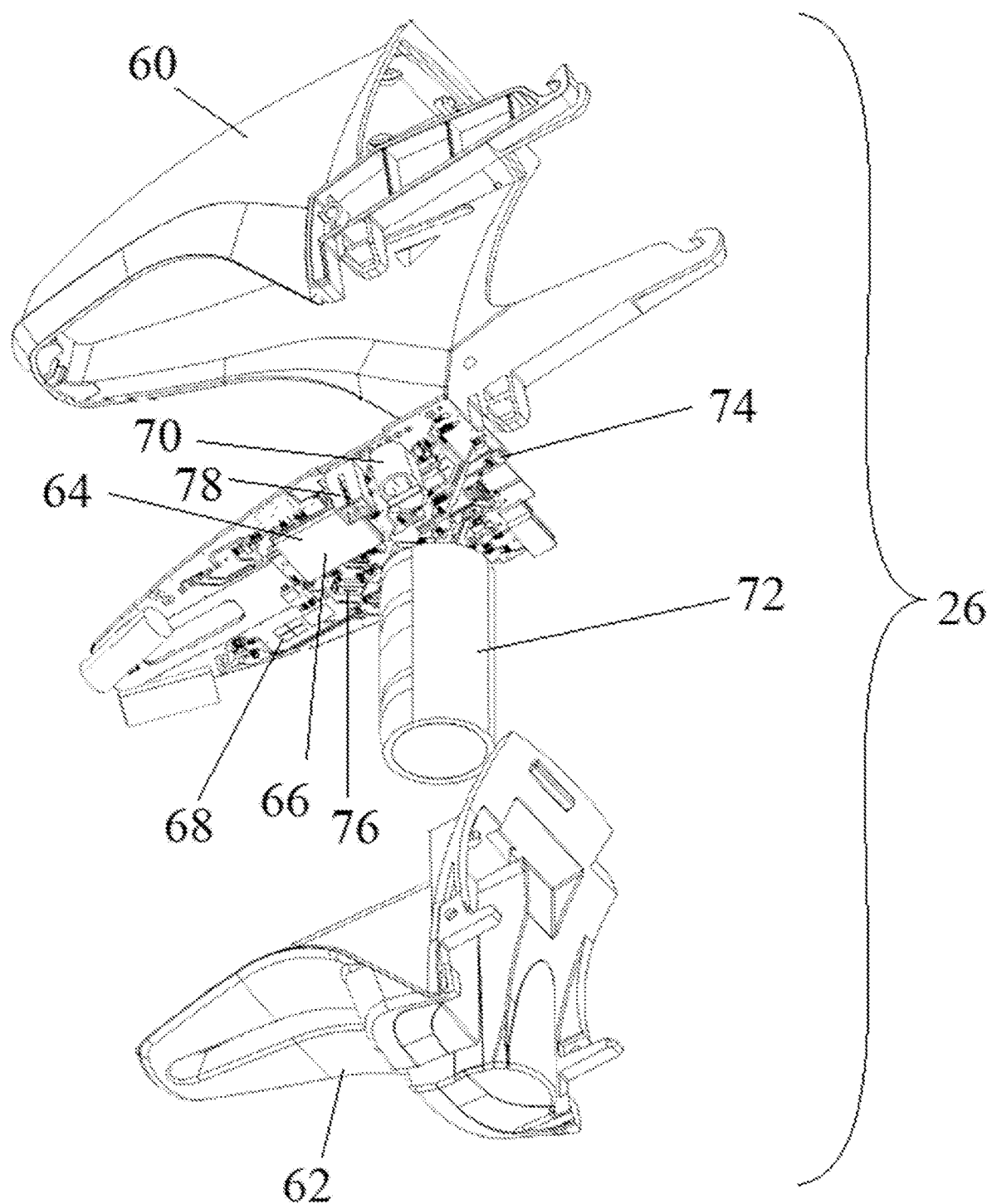
FIG. 2 is an exploded view of a smart cover of the fluid dispenser shown in FIG. 1.

As shown in exploded view in FIG. 2, the smart cover 26 has a three-part structure, with an upper cover portion 60, a lower cover portion 62, and a circuit board 64 sandwiched therebetween. The circuit board 64 carries a processor 66, memory 68, a wireless communication device 70, a battery 72, a pump activation sensor 74, a timer 76, and a reservoir sensor 78.

A first preferred manner of operating the fluid dispenser 10 will now be described with reference to FIGS. 1 to 5. To dispense hand cleaning fluid 14 from the fluid outlet 16 onto a user's hand 18, the actuator lever 12 is depressed from the rest position shown in FIG. 3 to the depressed position shown in FIG. 5, as is known in the art. Preferably, the smart cover 26 is configured to determine the volume of fluid 14 dispensed from the fluid dispenser 10 during each user interaction with the dispenser 10, and to provide an indication to the user 80 as to whether or not the volume of fluid 14 dispensed onto the user's hand 18 during the user interaction was equal to or greater than a threshold volume. The threshold volume could, for example, be the volume of hand cleaning fluid 14 that is required for compliance with an applicable hand hygiene protocol in place at the location where the dispenser 10 is located, such as in a hospital or long term care home, for example. The threshold volume could, for example, be 3 ml. Providing an indication to the user 80 as to whether or not the threshold volume of fluid 14 has been dispensed onto the user's hand 18 preferably assists the user 80 in remaining in compliance with the hand hygiene protocol.

The processor 66 is preferably programed to determine the volume of fluid 14 dispensed onto the user's hand 18 based at least in part on data received from the pump activation sensor 74 and the temperature sensor 42. The pump activation sensor 74 senses when the pump mechanism 24 has been activated, and could have any suitable form or structure. The pump activation sensor 74 could, for example, be a magnetic sensor that senses a change in a magnetic field caused by the movement of the actuator lever 12 from the rest position shown in FIG. 3 to the depressed position shown in FIG. 5. A person skilled in the art will appreciate that a wide variety of alternative arrangements for sensing when the pump mechanism 24 has been activated could also be used.

When the pump activation sensor 74 senses that the pump mechanism 24 has been activated, data indicating that the pump mechanism 24 has been activated is transmitted from the pump activation sensor 74 to the processor 66. Upon receiving the data indicating that the pump mechanism 24 has been activated, the processor 66 sends a signal to the temperature sensor 42, which causes the temperature sensor 42 to take a temperature reading of an external surface 46 presented by the user's hand 18 positioned below the fluid outlet 16. The external surface 46 whose temperature is measured by the temperature sensor 42 could be any surface or combination of surfaces presented by the user's hand 18, including, for example, the skin 82 on the palm of the user's hand 18 as shown in FIG. 4, the external surface of a glove on the user's hand 18, and/or the outer surface 84 of an allotment of the fluid 14 that has been dispensed onto the user's hand 18 as shown in FIG. 5.

When the temperature sensor 42 measures the temperature of the external surface 46 presented by the user's hand 18, data indicating the measured temperature of the external surface 46 is transmitted from the temperature sensor 42 to the processor 66. The processor 66 is configured to process the data received from the temperature sensor 42 to determine whether or not fluid 14 was dispensed onto the user's hand 18. The processor 66 may, for example, be configured to compare the measured temperature of the external surface 46 to a threshold temperature, and to determine that fluid 14 has been dispensed onto the user's hand 18 if the measured temperature of the external surface 46 is at or below the threshold temperature. The threshold temperature may, for example, be a temperature that has been determined through experimentation to be indicative of fluid 14 having been dispensed onto a user's hand 18.

Optionally, the determination as to whether fluid 14 has been dispensed onto the user's hand 18 is made based on a single temperature measurement performed by the temperature sensor 42 during or shortly after the pump mechanism 24 has been activated. More preferably, the determination is made based on two or more temperature measurements performed at different times, so as to give a more complete picture of the change in temperature of the external surface 42 over time.

For example, the temperature sensor 42 could be configured to take a first temperature measurement before any fluid 14 has passed through the pump mechanism 24, out the fluid outlet 16, and onto the user's hand 18. The first temperature measurement could be taken once initiation of the activation of the pump mechanism 24 is detected. The first temperature measurement preferably provides a baseline reading of the temperature of the external surface 42 presented by the user's hand 18 before any fluid 14 has been dispensed onto the user's hand 18. The external surface 42 whose temperature is measured by the first temperature measurement may, for example, be the skin 82 on the palm of the user's hand 18, when the user's hand 18 is positioned palm up under the fluid outlet 16 as shown in FIG. 3.

The temperature sensor 42 is preferably configured to then take a second temperature measurement after the first temperature measurement. The second temperature measurement is preferably performed after the fluid 14 has reached the user's hand 18, if any fluid 14 has been dispensed, and before the user's hand 18 has been removed from the area below the fluid outlet 16. The timing of the second temperature measurement could be selected, for example, based on experimentation to determine the amount of time that normally passes from the activation of the pump mechanism 24 until the fluid 14 reaches the user's hand 18, as well as the amount of time that the user's hand 18 normally remains below the fluid outlet 16 after the fluid 14 has been dispensed. If no fluid 14 is dispensed onto the user's hand 18 after the activation of the pump mechanism 24, as shown in FIG. 4, the external surface 42 whose temperature is measured by the second temperature measurement may, for example, include the skin 82 on the palm of the user's hand 18. If an allotment of fluid 14 is dispensed onto the user's hand 18, as shown in FIG. 5, the external surface 42 whose temperature is measured by the second temperature measurement may, for example, include the outer surface 84 of the allotment of fluid 14 and/or the skin 82 on the palm of the user's hand 18.

If no fluid 14 is dispensed onto the user's hand 18 after the pump mechanism 24 is activated, as shown in FIG. 4 and as might occur if the pump mechanism 24 needed to be primed, then the temperature of the external surface 42 presented by the user's hand 18 as measured during the second temperature measurement would normally be the same as the temperature of the external surface 42 presented by the user's hand 18 as measured during the first temperature measurement. The processor 66 is therefore preferably configured to interpret data received from the temperature sensor 42 that indicates that the temperature of the external surface 42 presented by the user's hand 18 remained the same between the first temperature measurement and the second temperature measurement as indicating that no fluid 14 was dispensed from the fluid dispenser 10.

If fluid 14 is dispensed onto the user's hand 18 as shown in FIG. 5, then the temperature of the external surface 42 presented by the user's hand 18 as measured during the second temperature measurement would normally be lower than the temperature of the external surface 42 presented by the user's hand 18 as measured during the first temperature measurement. This is, at least in part, due to the fact that the fluid 14 would normally be stored at a temperature that is lower than the temperature of the skin 82 on the palm of the user's hand 18, which would be warmed by the user's body heat. When the fluid 14 is dispensed onto the user's hand 18, the outer surface 84 of the allotment of fluid 14 as measured by the second temperature measurement would thus have a lower temperature than the temperature of the skin 82 on the palm of the user's hand 18 as measured by the first temperature measurement. Furthermore, due to the transfer of heat from the user's hand 18 to the lower temperature fluid 14, the temperature of the skin 82 on the palm of the user's hand 18 as measured by the second temperature measurement would also be expected to have a lower temperature than the temperature of the skin 82 on the palm of the user's hand 18 as measured by the first temperature measurement.

The processor 66 is preferably configured to compare the temperature of the external surface 46 presented by the user's hand 18 as measured by the first temperature measurement with the temperature of the external surface 46 presented by the user's hand 18 as measured by the second temperature measurement, and to determine whether or not fluid 14 has been dispensed onto the user's hand 18 based at least in part on the comparison. For example, the processor 66 could be configured to determine that fluid 14 has been dispensed onto the user' hand 18 if the temperature of the external surface 46 presented by the user's hand 18 as measured by the second temperature measurement is lower by a predetermined threshold amount in comparison to the temperature of the external surface 46 presented by the user's hand 18 as measured by the first temperature measurement. The predetermined threshold amount could, for example, be selected based on experimentation to determine what degree of a temperature decrease provides a reliable indication that fluid 14 has been dispensed onto the user's hand 18.

The processor 66 preferably distinguishes between dispensing activations of the pump mechanism 24, in which it is determined that fluid 14 was dispensed from the fluid dispenser 10, and non-dispensing activations of the pump mechanism 24, in which it is determined that no fluid 14 was dispensed from the fluid dispenser 10. To determine the volume of fluid 14 dispensed onto the user's hand 18 during a user interaction with the dispenser 10, the processor 66 optionally multiplies the number of dispensing activations that occurred during the user interaction by the known or estimated average volume of fluid 14 dispensed with each dispensing activation.

If the volume of fluid 14 dispensed onto the user's hand 18 during the user interaction is equal to or greater than the threshold volume, then the processor 66 preferably indicates this to the user 80 by, for example, illuminating the indicator light 48 with green light. The user 80 then knows that the volume of fluid 14 dispensed onto the user's hand 18 is sufficient, and the user 80 can proceed with rubbing the dispensed fluid 14 over the surface of the user's hands 18. If the volume of fluid 14 dispensed onto the user's hand 18 during the user interaction is less than the threshold volume, then the processor 66 preferably indicates this to the user 80 by, for example, illuminating the indicator light 48 with red light. The user 80 then knows that an insufficient volume of fluid 14 has been dispensed, and the user 80 should therefore continue activating the pump mechanism 24 until the indicator light 48 lights up green.

Providing an indication to the user 80 about whether a sufficient volume of fluid 14 has been dispensed onto the user's hand 18 preferably assists the user 80 in complying with the hand hygiene protocols in place at the location where the dispenser 10 is located, such as in a hospital or long term care home. The accuracy of the calculation of the volume of fluid 14 dispensed onto the user's hand 18, and thus the accuracy of the information communicated by the indicator light 48, is preferably improved by excluding non-dispensing activations from the calculation.

A variety of different mechanisms could be used for determining when a user interaction has begun and ended. For example, the timer 76 could be configured to keep track of the amount of time that passes between each activation of the pump mechanism 24, and the processor 66 could be configured to treat activations that occur within a threshold time interval of the previous activation as occurring within a single user interaction. If an amount of time greater than the threshold time interval has passed since the last activation, then the processor 66 will treat the next activation as the start of a new user interaction.

Alternatively, the smart cover 56 could incorporate a hand sensor 56, as shown in dotted lines in FIG. 3, which detects when a user's hand 18 is placed in the area below the fluid outlet 16, and detects when the user's hand 18 is removed from the area below the fluid outlet 16. Using data received from the hand sensor 56, the processor 66 could determine that a user interaction has begun when the user's hand 18 is placed in the area below the fluid outlet 16, and determine that the user interaction has ended when the user's hand 18 is removed from the area below the fluid outlet 16. The hand sensor 56 could have any suitable construction, and could for example be a time-of-flight sensor, a proximity sensor, and/or an infrared sensor.

The temperature sensor 42 could also be used to detect the presence of a user's hand 18 in the area below the fluid outlet 16 for the purpose of defining the start and end of each user interaction, without requiring a separate hand sensor 56. The temperature sensor 42 could, for example, be configured to take periodic temperature measurements of the area below the fluid outlet 16, and to detect the presence of a user's hand 18 in the area below the fluid outlet 16 based on the temperature of the user's hand 18.

In a further alternative configuration, the smart cover 56 could have a user sensor 58, as shown in dotted lines in FIG. 3, which detects when a user 80 approaches the area in front of the dispenser 10. Using data received from the user sensor 58, the processor 66 could determine that a user interaction has begun when a user 80 is detected in the area in front of the dispenser 10, and determine that the user interaction has ended when the user 80 has moved away from the dispenser 10. Other methods of defining the start and end of each user interaction could be used as well.

Alternative methods of determining the volume of fluid 14 that has been dispensed onto the user's hand 18 could also be used. For example, the pump activation sensor 74 could be configured to detect the precise location of the actuator lever 12 relative to the smart cover 26 over time. Preferably, the processor 66 is configured to calculate the volume of fluid 14 that is dispensed during each dispensing activation based on the actual detected movement of the actuator lever 12, with for example a full depression of the actuator lever 12 from the rest position of FIG. 3 to the depressed position of FIG. 5 dispensing more fluid 14 than a partial depression of the actuator lever 12. The volume of fluid 14 dispensed could, for example, be calculated as a function of the angular extent of movement of the lever 12. The total volume of fluid 14 dispensed during the user interaction is then calculated by adding up the volume of fluid 14 dispensed during each dispensing activation during the user interaction.

Alternative methods of operating the temperature sensor 42 could also be used. For example, the temperature sensor 42 could be configured to take multiple temperature measurements during each user interaction, to provide a more detailed picture of the changes in temperature of the external surface 42 presented by the user's hand 18 over time. The temperature sensor 42 could, for example, begin taking temperature measurements as soon as a user's hand 18 is detected under the fluid outlet 16 by the hand sensor 56, and continue taking temperature measurements on a continuous or periodic basis until the user's hand 18 has been removed from the area below the fluid outlet 16. The resulting data could then be analyzed by the processor 66 using a suitable algorithm to determine if/when fluid was dispensed onto the user's hand 18 during the user interaction.

When the fluid 14 is first dispensed onto a user's hand 18, the temperature of the external surface 42 presented by the user's hand 18 would normally be expected to decrease by a relatively large amount, and therefore be relatively easy to detect. For each subsequent allotment of fluid 14 that is dispensed on top of the first allotment of fluid 14, the change in temperature would be expected to be less pronounced. For this reason, the processor 66 is optionally configured so that, after a first dispensing activation is detected, the processor 66 assumes that each subsequent activation during the user interaction is also a dispensing activation.

Alternatively, the processor 66 could be configured to use a different set of criteria for identifying a first dispensing activation than for identifying subsequent dispensing activations during each user interaction. For example, the processor 66 could be configured to determine that a first dispensing activation has occurred if there is a relatively large decrease in the temperature of the external surface 46 presented by the user's hand 18. After the first dispensing activation is identified, the processor 66 could be configured to then assume that each subsequent activation of the pump mechanism 24 is a dispensing activation in the same user interaction, so long as the temperature of the external surface 46 presented by the user's hand 18 remains within a threshold range of expected temperatures. If the temperature of the external surface 46 presented by the user's hand 18 suddenly increases outside of the expected range of temperatures, the processor 66 could be configured to recognize this sudden increase in temperature as indicating that a new user's hand 18, which has not yet been cooled by receiving an allotment of fluid 14, has been placed under the fluid outlet 16, and that therefore a new user interaction has begun.

The processor 66 could also be configured to directly determine, after the first dispensing activation of a user interaction, whether each subsequent activation is a dispensing activation or a non-dispensing activation, based on the temperature of the external surface 46 presented by the user's hand 18 as measured by the temperature sensor 42. For example, in at least some circumstances, dispensing a subsequent allotment of the fluid 14 on top of a first allotment of fluid 14 already present on the user's hand 18 would be expected to produce a measurable change in temperature. This might occur, for example, because the temperature of the first allotment of fluid 14 has increased by absorbing heat from the user's hand 18, so that dispensing a subsequent allotment of fluid 14 on top of the first allotment of fluid 14 decreases the temperature of the external surface 46 presented by the user's hand 18 at least momentarily, before the subsequent allotment of fluid 16 has had an opportunity to absorb body heat from the user's hand 18. The temperature sensor 42 is preferably sensitive enough to detect this change in temperature, and the processor 66 is preferably configured to recognize the change in temperature as indicating that the subsequent activation was a dispensing activation.

The temperature sensor 42 optionally measures the temperature at multiple points over an area of the external surface 46 presented by the user's hand 18, rather than at a single point. This preferably allows the processor 66 to produce a two-dimensional temperature map of the external surface 46. Optionally, the processor 66 is configured to determine, after the first dispensing activation of a user interaction, whether each subsequent activation is a dispensing activation or a non-dispensing activation based on changes in the two-dimensional temperature map over time. For example, after the first dispensing activation, the two-dimensional temperature map would be expected to show an area of relatively low temperature where the first allocation of fluid 14 is located on the user's hand 18, surrounded by an area of higher temperature where the skin 82 on the palm of the user's hand 18 is exposed. When a subsequent allotment of fluid 14 is dispensed on top of the first allotment of fluid 14, the area of the user's hand 18 that is covered by fluid 14 would normally be expected to increase, resulting in an expansion of the area of relatively low temperature on the temperature map. In contrast, if a subsequent activation does not result in the dispensing of any additional fluid 14 onto the user's hand 18, as might occur for example if the fluid reservoir 22 runs out of fluid 14, then the area of relatively low temperature on the temperature map might be expected to remain the same size and to increase in temperature as the fluid 14 is warmed by the user's hand 18. The processor 66 is optionally configured to analyze such changes in the temperature map over time to determine whether subsequent activations of the pump mechanism 24 are dispensing activations or non-dispensing activations.

The processor 66 could also be configured to determine the volume of fluid 14 dispensed from the fluid dispenser 10 over any other time interval, and not just for each user interaction. For example, the processor 66 could be configured to determine the volume of fluid 14 dispensed from the fluid dispenser 10 during a reservoir usage period, where the reservoir usage period refers to a time period that commences when the fluid reservoir 22 is installed in the housing 20 or is refilled, and ends when the fluid reservoir 22 is replaced or is subsequently refilled. The reservoir usage period may, for example, be determined by the processor 66 based on detection data from the reservoir sensor 78. The reservoir sensor 78 is preferably configured to detect whether or not the fluid reservoir 22 is installed in place in the housing 20. The reservoir sensor 78 could, for example, be an optical sensor that can detect the presence or absence of the fluid reservoir 22 below the smart cover 26 through a window, not shown, in the lower cover portion 62 of the smart cover 26. Other sensors that provide a direct or indirect indication that the fluid reservoir 22 has been refilled or replaced could also be used.

Preferably, the processor 66 has access to information about the volume of fluid 14 that is normally contained in the fluid reservoir 22 when the fluid reservoir 22 is installed or refilled. This information may, for example, be pre-programed and saved in the memory 68. The information could also be wirelessly transmitted to the processor 66 via the communication device 70, such as through a Bluetooth™ connection with a cell phone of a maintenance staff member when the reservoir 22 is being installed. The processor 66 preferably keeps a running tally of the volume of fluid that remains in the fluid reservoir 22 over the reservoir usage period, by subtracting the volume of fluid 14 dispensed during each dispensing activation from the remaining volume. By excluding non-dispensing activations from the tally, which may occur for example when the pump mechanism 24 is being primed, the processor 66 is preferably able to make a more accurate determination of the volume of fluid 14 remaining in the reservoir 22.

Preferably, the processor 66 is configured to provide an indication when the supply of fluid 14 in the fluid reservoir 22 is running low, so that maintenance staff are made aware that the supply of fluid 14 is running low and can therefore refill or replace the fluid reservoir 22 before the supply of fluid 14 runs out. The processor 66 may, for example, be configured to change the illumination state of the indicator light 48 when it is determined that the volume of fluid 14 dispensed during the reservoir usage period is equal to or greater than a reservoir threshold volume, such as by illuminating the indicator light 48 with a blinking blue light. The reservoir threshold volume is preferably selected so that maintenance staff will normally have enough time to replace or refill the fluid reservoir 22 before the supply of fluid 14 runs out. The reservoir threshold volume could be selected, for example, having regard to the type and size of the fluid reservoir 22, the type of fluid 14, the frequency at which the dispenser 10 is used, and/or the amount of time that it normally takes for maintenance staff to service the dispenser 10. The smart cover 26 also optionally includes a display screen 54, shown in dotted lines in FIG. 3, which could display an alert indicating that the reservoir 22 needs to be refilled or replaced. The processor 66 could also be configured to send an alert to maintenance staff via the communication device 70, such as by sending an e-mail alert via a Wi-Fi™ connection.

The processor 66 could also be configured to use the temperature data received from the temperature sensor 42 for purposes other than determining the volume of fluid 14 dispensed from the fluid dispenser 10. For example, the processor 66 could be configured to record each dispensing activation and each non-dispensing activation of the dispenser 10 in the memory 68, and to periodically send to a dispenser monitoring system or usage monitoring system, via the communication device 70, data logs of all of the recorded dispensing and non-dispensing activations. This information could then be used to analyze the performance of the dispenser 10 over time, including for example assessing how frequently the pump mechanism 24 needs to be primed.

If it is found that the pump mechanism 24 needs to be primed frequently, the manufacturer or supplier of the dispenser 10 can be notified, and the reasons why the pump mechanism 24 needs to be primed frequently can be investigated. Possible reasons might include that the fluid 14 within the pump mechanism 24 is evaporating over time and/or that a valve within the pump mechanism 24 is allowing the fluid 14 within the pump mechanism 24 to leak back into the reservoir 22. This information can then be used to repair the pump mechanism 24, to improve the design of the pump mechanism 24, and/or to improve the formulation of the fluid 14.

The dispenser monitoring system or usage monitoring system could also analyze the record of dispensing and non-dispensing activations from a variety of dispensers 10 to, for example, improve predictions about the number of activations required to empty the fluid 14 from a fluid reservoir 22 for various combinations of dispensers 10, fluid reservoirs 22, and fluids 14. The dispenser monitoring system or usage monitoring system also optionally monitors the volume of the fluid 14 that has been dispensed from the fluid dispenser 10 over time, to for example monitor hand hygiene compliance or to predict when new orders of fluid reservoirs 22 will be needed.

The processor 66 could also use the temperature data received from the temperature sensor 42 to determine whether the fluid dispenser 10 requires maintenance. For example, if there are many non-dispensing activations in a row, this could indicate that the pump mechanism 24 is malfunctioning, or that the fluid reservoir 22 is empty. Preferably, the processor 66 is configured to determine the amount and/or frequency of non-dispensing activations, and to determine whether the fluid dispenser 10 requires maintenance based at least in part on the amount and/or frequency of non-dispensing activations. The processor 66 may, for example, be configured to compare the quantity of non-dispensing activations to a threshold quantity, and if the quantity of non-dispensing activations exceeds the threshold quantity, to determine that the dispenser 10 requires maintenance. The threshold quantity could, for example, be a number of non-dispensing activations in a row; a number of non-dispensing activations over a given period of time; and/or a percentage of activations that were non-dispensing over a given time period.

The processor 66 preferably provides an indication to users 80 and/or to maintenance staff when it is determined that the dispenser 10 requires maintenance. For example, the processor 66 could be configured to display an out of order message on the display screen 54, to warn users 80 that the dispenser 10 is not operating as intended. The processor 66 could also send an alert to maintenance staff and/or a computerized maintenance monitoring system when the dispenser 10 requires maintenance, such as by sending an e-mail alert via the communication device 70. This preferably assists maintenance staff in rapidly identifying fluid dispensers 10 that require maintenance, so that the dispensers 10 can be returned to normal function as soon as possible.

Figure 6:
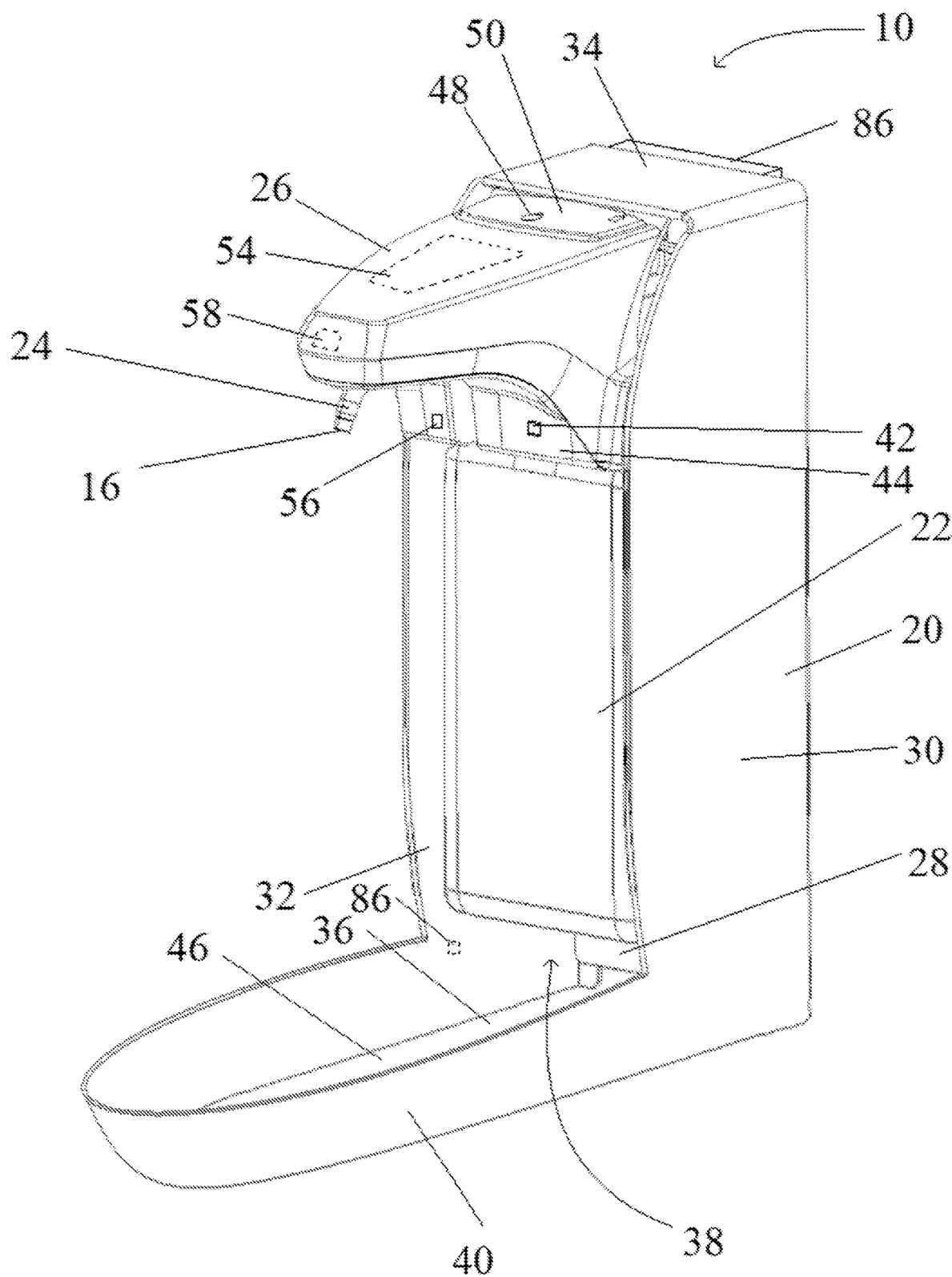
FIG. 6 is a perspective view of a fluid dispenser in accordance with a second embodiment of the present invention, with no fluid dispensed onto a drip tray of the fluid dispenser.
Figure 7:
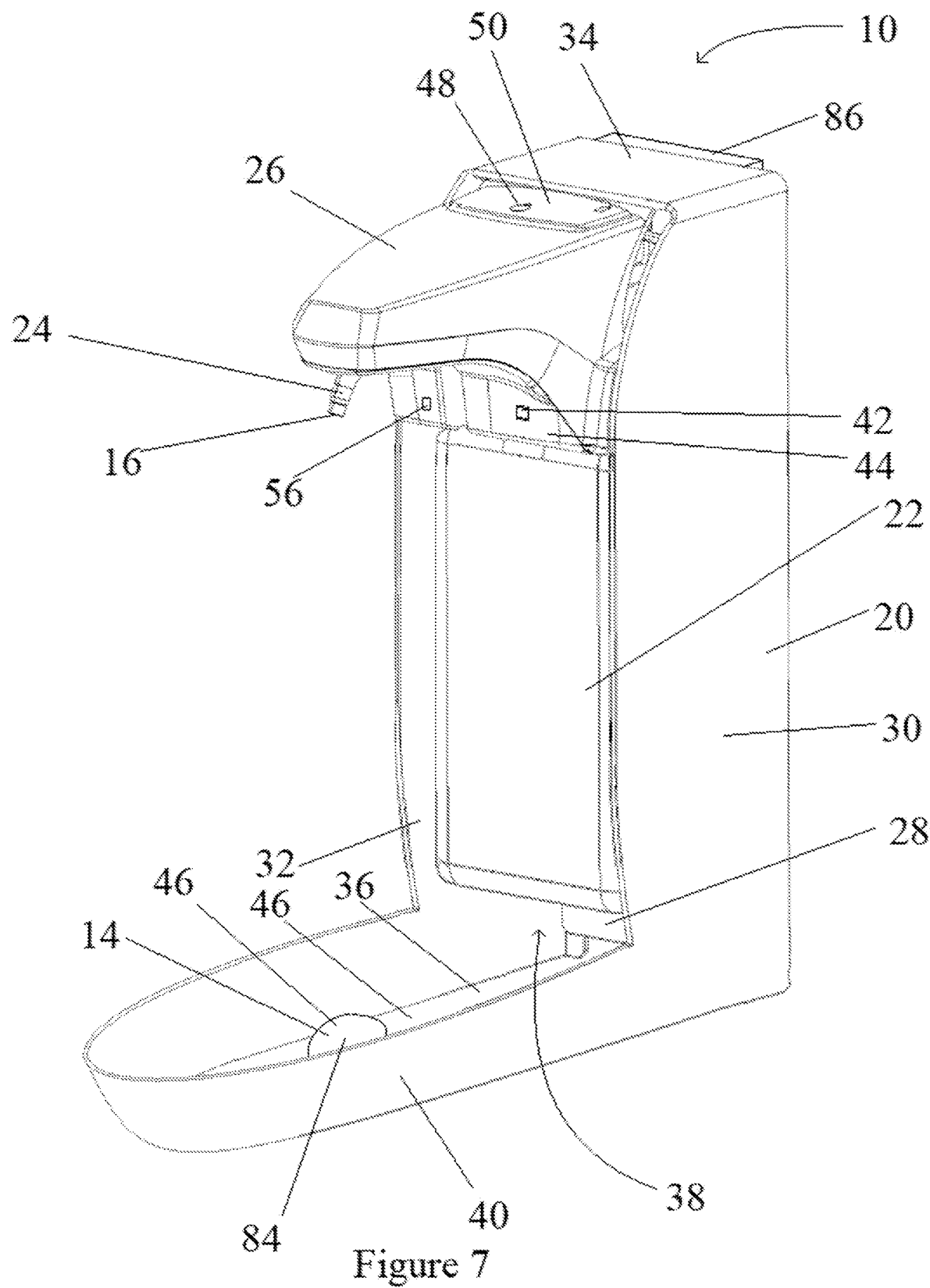
FIG. 7 is a perspective view of the fluid dispenser shown in FIG. 6, with a volume of fluid dispensed onto the drip tray.

Reference is now made to FIGS. 6 and 7, which show a fluid dispenser 10 in accordance with a second embodiment of the invention. Like numerals are used to denote like components.

In the first embodiment of the invention shown in FIGS. 1 to 5, the fluid dispenser 10 is manually operated to dispense fluid 14 by manually depressing the actuator lever 12. In the second embodiment of the invention shown in FIGS. 6 and 7, the fluid dispenser 10 is operated electronically. The fluid dispenser 10 shown in FIGS. 6 and 7 has an electronic pump activation mechanism 86 instead of an actuator lever 12, and is otherwise identical to the fluid dispenser 10 shown in FIGS. 1 to 5.

The electronic pump activation mechanism 86 is configured to activate the pump mechanism 24. The electronic pump activation mechanism 86 could have any suitable construction, including for example any known selection and arrangement of components for electronically activating a fluid dispenser 10. Electronic pump activation mechanisms 86 such as those taught by U.S. Pat. No. 7,984,825 to Ophardt et al., issued Jul. 26, 2011; U.S. Pat. No. 8,397,949 to Ophardt, issued Mar. 19, 2013; U.S. Pat. No. 9,027,788 to Ophardt et al., issued May 12, 2015; U.S. Pat. No. 8,622,243 to Ophardt et al., issued Jan. 7, 2014; U.S. Pat. No. 8,733, 596 to Ophardt et al., issued May 27, 2004; and U.S. Pat. No. 7,455,197 to Ophardt, issued Nov. 25, 2008, which are incorporated herein by reference, could be used for example. The electronic pump activation mechanism 86 could, for example, include an electric motor.

The electronic pump activation mechanism 86 is configured to allow a user 80 to activate the pump mechanism 24 to dispense an allotment of fluid 14 without having to manually depress an actuator lever 12. For example, the processor 66 could be configured to control the electronic pump activation mechanism 86 to activate the pump mechanism 24 upon receiving data from the hand sensor 56 indicating that a user's hand 18 has been placed in the area below the fluid outlet 16. This allows for touchless operation of the dispenser 10. The electronic pump activation mechanism 86 could also optionally be activated by other mechanisms, such as by a button or a foot pedal, not shown.

Preferably, when the fluid dispenser 10 is operated electronically, the processor 66 controls the electronic pump activation mechanism 86 to activate the pump mechanism 24 during a first activation time period. The first activation time period may commence, for example, when the user's hand 18 is detected in the area below the fluid outlet 16, and end after a pre-set amount of time has passed. The processor 66 preferably uses the temperature data from the temperature sensor 42 to determine whether fluid 14 was dispensed onto the user's hand 18 during the first activation time period, in the same manner as described above, that is to distinguish between dispensing activations and non-dispensing activations.

If the processor 66 determines that no fluid 14 was dispensed onto the user's hand 18 during the first activation time period, the processor 66 preferably controls the electronic pump activation mechanism 86 to repeatedly activate the pump mechanism 24 until a stop condition is satisfied. The stop condition may include, for example, determining that fluid 14 has been dispensed onto the user's hand 18 based on data received from the temperature sensor 42; determining that the threshold volume of fluid 14 has been dispensed onto the user's hand 18 based on data received from the temperature sensor 42; and/or determining that a number of activations of the pump mechanism 24 exceeds a threshold amount. The threshold amount is preferably selected to exceed the number of activations that would normally be required to prime the pump mechanism 24. If the number of activations exceeds the threshold amount and no fluid 14 has been dispensed onto the user's hand 18, the processor 66 is preferably configured to send an alert to maintenance staff indicating that the dispenser 10 requires maintenance.

The processor 66 preferably controls the electronic pump activation mechanism 86 to repeatedly activate the pump mechanism 24 until the threshold volume of fluid 14 has been dispensed onto the user's hand 18. To determine the volume of fluid 14 that has been dispensed, the processor 66 distinguishes between dispensing activations and non-dispensing activations based on the temperature data received from the temperature sensor 42, in the same manner as described above. When calculating the volume of fluid 14 dispensed, the processor 66 excludes the non-dispensing activations from the tally. This preferably helps to reduce the likelihood of the electronic pump activation mechanism 86 stopping the activations of the pump mechanism 24 prematurely, before the threshold volume of fluid 14 has been dispensed, for example because the first one or two activations of the pump mechanism 24 were required to prime the pump mechanism 24 and did not dispense any fluid 14.

The temperature sensor 42 is optionally configured to detect the temperature of an external surface 46 presented by the drip tray 40, in addition to or in place of detecting the temperature of an external surface 46 presented by a user's hand 18. Detecting the temperature of the external surface 46 presented by the drip tray 40 preferably allows the processor 66 to determine when fluid 14 has been dispensed onto the drip tray 40.

In at least some circumstances, the temperature of an external surface 42 presented by a drip tray 40 would be expected to decrease upon having an allotment of hand cleaning fluid 14 dispensed onto the drip tray 40. This decrease in temperature may be caused, for example, by evaporation of the fluid 14. The evaporative cooling effect may be particularly pronounced for fluids 14 that evaporate rapidly, such as foamed hand sanitizers that contain a high concentration of alcohol. A change in the temperature of the external surface 42 presented by a drip tray 40 could also occur, whether an increase or a decrease, for example, if the fluid 14 dispensed onto the drip tray 40 is stored at a different temperature than the temperature of the drip tray 40.

To reduce the burden on users 80 having to prime the pump mechanism 24, the processor 66 is optionally configured to automatically prime the pump mechanism 24. For example, when a predetermined trigger condition is satisfied, the processor 66 could be configured to control the electronic pump activation mechanism 86 to repeatedly activate the pump mechanism 24 until the temperature sensor 42 detects that an allotment of fluid 14 has been dispensed onto the drip tray 40, thus indicating that the pump mechanism 24 is primed. The trigger condition could, for example, be that a dispenser 10 is being activated for the first time, that a new fluid reservoir 22 and/or a new pump mechanism 24 is coupled to the dispenser 10; that a scheduled pump activation time has arrived; that a threshold time interval has passed since the last activation; and/or that a user 80 has been detected in the vicinity of the dispenser 10 by, for example, the user sensor 58.

The processor 66 is preferably configured to determine, based on temperature data received from the temperature sensor 42, whether fluid 14 was dispensed onto the drip tray 40 during a first activation time period, as shown in FIG. 7, or that no fluid 14 was dispensed onto the drip tray 40 during the first activation time period, as shown in FIG. 6. The first activation time period may commence, for example, when the pump mechanism 24 is first activated upon the trigger condition being satisfied, and end after a pre-set amount of time has passed after the first activation. The processor 66 preferably determines whether the fluid 14 has been dispensed onto the drip tray 40 in the same manner as how the processor 66 determines whether fluid 14 has been dispensed onto the user's hand 18 as described above. The processor 66 may, for example, use a single temperature measurement of the external surface 46 presented by the drip tray 40 or multiple temperature measurements of the external surface 46 presented by the drip tray 40 to determine whether or not fluid 14 has been dispensed onto the drip tray 40. The external surface 46 whose temperature is measured may include the upper surface of the bottom wall 36 of the drip tray 40 as shown in FIG. 6 and/or the outer surface 84 of the allotment of fluid 14 dispensed into the drip tray 40 as shown in FIG. 7.

The processor 66 is preferably configured to stop the automatic priming of the pump mechanism 24 when the temperature sensor 42 detects that fluid 14 has been dispensed onto the drip tray 40. The processor 66 is also preferably configured to stop the automatic priming of the pump mechanism 24 if another stop condition is satisfied, such as if the number of activations exceeds a threshold quantity. This preferably prevents the pump mechanism 24 from being repeatedly activated when the fluid reservoir 22 is empty and/or the pump mechanism 24 is malfunctioning. Preferably, if the processor 66 determines that the number of activations of the pump mechanism 24 exceeds the threshold quantity, then the processor 66 provides an indication that the dispenser 10 requires service, such as by changing the illumination state of the indicator light 48 or sending an alert e-mail to maintenance staff via the communication device 70.

Using the temperature sensor 42 to detect when fluid 14 has dropped into the drip tray 40 may be useful for many purposes, and not just the automatic priming of the pump mechanism 24. For example, being able to distinguish between dispensing activations and non-dispensing activations of the pump mechanism 24 when the pump mechanism 24 is activated without a user's hand 18 being present in the area below the fluid outlet 16 allows the processor 66 to take into account dispensing activations that occur without a user's hand 18 being present in the area below the fluid outlet 16 when calculating the volume of fluid remaining in the fluid reservoir 22 as described above. Being able to detect when fluid 14 has fallen onto the drip tray 40 may also be useful for detecting when the fluid outlet 16 is leaking, for example. To detect when the fluid outlet 16 is leaking, the temperature sensor 42 could for example be configured to take periodic temperature measurements of the external surface 46 presented by the drip tray 40, such as every 10 seconds, every minute, every five minutes, every thirty minutes, or at any other desired time interval.

The temperature sensor 42 is also preferably able to detect when fluid 14 has been dispensed onto the drip tray 40, even when a user's hand 18 is present in the area below the fluid outlet 16. This might occur, for example, if some or all of the fluid 14 dispensed from the fluid outlet 14 passes between the fingers on the user's hand 18 and falls into the drip tray 40.

To be able to detect when fluid 14 has been dispensed onto the drip tray 40, even when a user's hand 18 is present in the area below the fluid outlet 16, the temperature sensor 42 is preferably positioned and angled so as to have an unobstructed view of both the external surface 46 presented by the drip tray 40 and the external surface 46 presented by the user's hand 18 when the user's hand 18 is present in the area below the fluid outlet 16. For example, the temperature sensor 42 may be mounted at a location that is above the user's hand 18 and horizontally spaced from the user's hand 18, so that the user's hand 18, when positioned in the area below the fluid outlet 16, does not block the line of sight between the temperature sensor 42 and the drip tray 40. With such an arrangement, the temperature sensor 42 can preferably be used to take temperature measurements of both the external surface 46 presented by the drip tray 40 and the external surface 46 presented by the user's hand 18 when the user's hand 18 is present in the area below the fluid outlet 16.

Alternatively, the first temperature sensor 42 could be positioned specifically for measuring the temperature of the external surface 46 presented by the user's hand 18, and the dispenser 10 could have a second temperature sensor 86 that is positioned specifically for measuring the temperature of the external surface 46 presented by the drip tray 40. The second temperature sensor 86 could, for example, be positioned lower than the first temperature sensor 42, so that the user's hand 18 will not block the line of sight between the second temperature sensor 86 and the external surface 46 presented by the drip tray 40 when the user's hand 18 is present in the area below the fluid outlet 16. One possible location for the second temperature sensor 86, on the side wall 32 of the housing 20, is shown in dotted lines in FIG. 6.

Preferably, the processor 66 is configured to treat an activation of the pump mechanism 24 in which the fluid 14 is dispensed into the drip tray 40 while the user's hand 18 is present under the fluid outlet 16 as a dispensing activation for the purpose of calculating the total volume of fluid 14 dispensed from the fluid reservoir 22, but as a non-compliant activation for the purpose of calculating whether the threshold volume of fluid 14 has been dispensed onto the user's hand 18. The processor 66 may, for example, treat non-compliant activations of the dispenser 10 as not having dispensed any fluid 14 onto the user's hand 18. This preferably reduces the likelihood of the indicator light 48 lighting up green prematurely before the threshold volume of fluid 14 has been dispensed onto the user's hand 18, as a result of some of the dispensed fluid 14 having missed the user's hand 18 and fallen into the drip tray 40.

Optionally, the processor 66 is configured to determine whether fluid 14 that has dropped into the drip tray 40 was dispensed directly from the fluid outlet 16, or engaged with a user's hand 18, or another object such as a tool to be cleaned, before falling into the drip tray 40. For example, if the temperature sensor 42 detects a change in the temperature of the external surface 46 presented by the user's hand 18, and then later after some time has passed detects a change in the temperature of the external surface 46 presented by the drip tray 40, the processor 66 could be configured to recognize this pattern of temperature changes as indicating that the fluid 14 was dispensed onto the user's hand 18, and subsequently at least some of the fluid 14 dripped from the user's hand 18 into the drip tray 40.

The processor 66 could also be configured to use other criteria for determining whether the fluid 14 that has dropped into the drip tray 40 was dispensed directly or indirectly into the drip tray 40. For example, a time delay between the activation of the pump mechanism 24 and a change in the temperature of the external surface 46 presented by the drip tray 40 could be used as an indication that the fluid 14 was dispensed onto the user's hand 18 or some other object before falling into the drip tray 40.

In some circumstances, fluid 14 that has been in contact with the user's hand 18 or another object before falling into the drip tray 40 would be expected to produce a change in the temperature of the external surface 46 presented by the drip tray 40 that differs from the change in the temperature that would occur if the fluid 14 was dispensed directly into the drip tray 40. For example, fluid 14 that is dispensed onto a user's hand 18 would normally be expected to increase in temperature because of the user's body heat. When the warmed fluid 14 then falls into the drip tray 40, the temperature sensor 42 in at least some circumstances would be expected to detect an increase in the temperature of the external surface 46 presented by the drip tray 40. In contrast, when the fluid 14 is dispensed directly into the drip tray 40, in at least some circumstances a decrease in the temperature of the external surface 46 presented by the drip tray 40 would be expected, due to the evaporation of the fluid 14. The processor 66 is optionally configured to determine whether fluid 14 that has dropped into the drip tray 40 was dispensed directly into the drip tray 40 or indirectly via the user's hand 18 or another object based on the temperature change that is detected, with for example an increase in the temperature of the external surface 46 presented by the drip tray 40 indicating that the fluid 14 was in contact with the user's hand 18 before falling into the drip tray 40, and a decrease in the temperature of the external surface 46 presented by the drip tray 40 indicating that the fluid 14 was dispensed directly into the drip tray 40.

Optionally, the processor 66 is configured to determine what proportion of the fluid 14 that has dropped into the drip tray 40 was dispensed directly into the drip tray 40, and what proportion of the fluid 14 that has dropped into the drip tray 40 contacted an object, such as the user's hand 18, before falling into the drip tray 40. The processor 66 may, for example, produce a temperature map of the external surface 46 presented by the user's hand 18 over time and a temperature map of the external surface 46 presented by the drip tray 40 over time, and determine what percentage of the fluid 14 that has dropped into the drip tray 40 was dispensed directly into the drip tray 40 and what percentage contacted an object, such as the user's hand 18, before falling into the drip tray 40. The processor 66 could, for example, compare on the temperature maps the relative timing of the temperature changes, the relative sizes of the areas where temperature changes are detected, and the relative magnitudes of the temperature changes to assess the volume of fluid 14 that was dispensed onto the user's hand 18, the volume of fluid 14 that was dispensed directly into the drip tray 40, and the volume of fluid 14 dispensed onto the user's hand 18 that fell into the drip tray 40.

Optionally, when the processor 66 determines that fluid 14 has dropped into the drip tray 40, the processor 66 is configured to initiate one or more actions. For example, the processor 66 could be configured to initiate one or more actions that process the fluid 14 that has collected in the drip tray 40. Optionally, the fluid dispenser 10 could incorporate a contaminant sensor, not shown, such as is described in U.S. Pat. No. 9,437,103 to Ophardt, issued Sep. 6, 2016, which is incorporated herein by reference. Upon determining that fluid 14 has dropped into the drip tray 40, the processor 66 could, for example, activate a contaminant sensor to detect whether there are any contaminants in the fluid 14 that has collected in the drip tray 40. The processor 66 could also be configured to activate a pump to pump some or all of the fluid 14 out of the drip tray 40, such as through or to a contaminant sensor, to a drain, to a container for storage or disposal of the fluid 14, or to/through a fuel cell to generate electrical power from the fluid 14, which may for example be used to power one or more electronic components of the dispenser 10. The processor 66 could also be configured to initiate other actions when the processor 66 determines that fluid 14 has fallen into the drip tray 40, such as opening an outlet valve to allow the fluid 14 to drain from the drip tray 40 under the force of gravity.

The processor 66 could optionally be configured to initiate one or more actions only when the processor 66 determines that the fluid 14 was dispensed directly into the drip tray 40, or only when the processor 66 determines that the fluid 14 fell into the drip tray 40 after being dispensed onto an object, such as the user's hand 18. For example, the processor 66 could be configured to activate a contaminant sensor only when the processor 66 determines that the fluid 14 that has fallen into the drip tray 40 was in contact with a user's hand 18. The processor 66 could also be configured to initiate different actions depending on whether the fluid 14 was dispensed directly or indirectly into the drip tray 40. For example, if the fluid 14 was dispensed directly into the drip tray 40, the processor 66 could activate a pump to pump the fluid 14 to a container for disposal, and if the fluid 14 contacted a user's hand 18 before falling into the drip tray 40, the processor 66 could activate a pump to pump the fluid 14 to or through a contaminant sensor.

Optionally, each time the processor 66 determines that fluid 14 has dropped into the drip tray 40, the processor 66 makes a record of whether the fluid 14 was dispensed directly into the drip tray 40 or fell into the drip tray 40 after coming into contact with an object, such as the user's hand 18. This information can then be used for any of a variety of purposes. For example, if a contaminant sensor determines that the fluid 14 that has fallen into the drip tray 40 contains a contaminant, such as a bacteria or virus, the record of whether the fluid 14 was dispensed directly into the drip tray 40 or fell into the drip tray 40 after coming into contact with an object, such as the user's hand 18, can preferably be used to assist in identifying the source of the contamination.

The processor 66 could also use the temperature data from the temperature sensor 42 for other purposes, such as for determining whether the user 80 has a fever. If the user 80 is determined to have a fever based on the temperature of the user's hand 18, a warning could be displayed on the display screen 54, for example.

Optionally, the dispenser 10 is communicatively linked to a door opening mechanism, not shown, so that operation of the dispenser 10 can be used to open a door. The dispenser 10 could, for example, be mounted beside the door or even on the door itself. Optionally, when the pump mechanism 24 is activated, a signal is sent to the door opening mechanism that causes the door to open. This preferably allows the user 80 to pass through the door without having to manually touch the door, and thus reduces the risk of contamination.

Using the operation of the dispenser 10 to open a door also preferably encourages users 80 to sanitize their hands before passing through the door, which may for example be of particular importance at the entrances to hospitals or other facilities or rooms where proper hand hygiene is essential. The dispenser 10 and/or the door opening mechanism could also be configured to deny entry to a user 80 and/or to take other appropriate action when the user 80 is determined to have a fever based on the temperature data received from the temperature sensor 42. A user 80 who is found to have a fever could, for example, be directed to an alternate entrance to a hospital.

Optionally, when the pump mechanism 24 is activated, the processor 66 uses the temperature data from the temperature sensor 42 to determine whether the fluid 14 was dispensed onto a user's hand 18 having the expected body temperature, or onto another object having a lower temperature such as the drip tray 40. The processor 66 preferably sends the door opening signal to the door opening mechanism only when the fluid 14 was dispensed onto the user's hand 18. This preferably helps to prevent a user 80 from activating the pump mechanism 24 to open the door, without actually dispensing the fluid 14 onto the user's hand 18. The processor 66 may furthermore be configured to only send the door opening signal when the threshold volume of fluid 14 has been dispensed onto the user's hand 18.

Although the embodiment shown in FIGS. 1 to 5 has been described as being manually operated, the embodiment shown in FIGS. 1 to 5 could be adapted for electronic and/or touchless operation as well. The embodiment shown in FIGS. 1 to 5 could, for example, incorporate an electronic pump activation mechanism 86 as shown in FIGS. 6 and 7, in place of or in addition to the actuator lever 12. The embodiment shown in FIGS. 6 and 7 could likewise be adapted for manual operation, such as by incorporating an actuator lever 12 as shown in FIGS. 1 to 5, in addition to or in place of the electronic pump activation mechanism 86. The various uses and modes of operation described with reference to the first embodiment of the invention shown in FIGS. 1 to 5 could also be performed with the second embodiment of the invention shown in FIGS. 6 and 7, and the various uses and modes of operation described with reference to the second embodiment of the invention shown in FIGS. 6 and 7 could also be performed with the first embodiment of the invention shown in FIGS. 1 to 5. For example, the first embodiment of the invention shown in FIGS. 1 to 5 could be configured to determine when fluid 14 has been dispensed onto the drip tray 40, in the same manner as described with reference to the second embodiment shown in FIGS. 6 and 7.

The embodiments shown in FIGS. 1 to 7 and described above therefore provide a method comprising: providing a fluid dispenser 10 having a temperature sensor 42 that senses a temperature of an external surface 46 presented by a user's hand 18, and a pump mechanism 24 that is configured to dispense fluid 14 onto the user's hand 18 when the pump mechanism 24 is activated; using the temperature sensor 42 to sense the temperature of the external surface 46 presented by the user's hand 18; and determining, based at least in part on the temperature of the external surface 46 presented by the user's hand 18, whether the fluid 14 has been dispensed onto the user's hand 18.

The embodiments shown in FIGS. 1 to 7 and described above therefore also provide a method comprising: providing a fluid dispenser 10 having a temperature sensor 42 that senses a temperature of an external surface 46 presented by a drip tray 40, and a pump mechanism 24 that is configured to dispense fluid 14 when the pump mechanism 24 is activated; using the temperature sensor 42 to sense the temperature of the external surface 46 presented by the drip tray 40; and determining, based at least in part on the temperature of the external surface 46 presented by the drip tray 40, whether the fluid 14 has been dispensed.

The embodiments shown in FIGS. 1 to 7 and described above therefore also provide a fluid dispenser 10 comprising: a temperature sensor 42 that senses a temperature of an external surface 46 presented by a user's hand 18; a pump mechanism 24 that is configured to dispense fluid 14 onto the user's hand 18 when the pump mechanism 24 is activated; and a processor 66 that determines, based at least in part on the temperature of the external surface 46 presented by the user's hand 18, whether the fluid 14 has been dispensed onto the user's hand 18.

The embodiments shown in FIGS. 1 to 7 and described above therefore also provide a fluid dispenser 10 comprising: a drip tray 40; a temperature sensor 42 that senses a temperature of an external surface 46 presented by the drip tray 40; a fluid outlet 16 that is positioned above the drip tray 40; a pump mechanism 24 that is configured to dispense fluid 14 from the fluid outlet 16 when the pump mechanism 24 is activated; and a processor 66 that determines, based at least in part on the temperature of the external surface 46 presented by the drip tray 40, whether the fluid 14 has been dispensed.

The embodiments shown in FIGS. 1 to 7 and described above therefore also provide a smart cover 26 for a fluid dispenser 10, the smart cover 26 comprising: a temperature sensor 42 that senses a temperature of an external surface 46 presented by a user's hand 18; and a processor 66 that determines, based at least in part on the temperature of the external surface 46 presented by the user's hand 18, whether fluid 14 has been dispensed from the fluid dispenser 10 onto the user's hand 18.

The embodiments shown in FIGS. 1 to 7 and described above therefore also provide a smart cover 26 for a fluid dispenser 10, the smart cover 26 comprising: a temperature sensor 42 that senses a temperature of an external surface 46 presented by a drip tray 40; and a processor 66 that determines, based at least in part on the temperature of the external surface 46 presented by the drip tray 40, whether fluid 14 has been dispensed from the fluid dispenser 10.

It will be understood that, although various features of the invention have been described with respect to one or another of the embodiments of the invention, the various features and embodiments of the invention may be combined or used in conjunction with other features and embodiments of the invention as described and illustrated herein.

The invention is not limited to the particular construction of the fluid dispenser 10, including the actuator lever 12, the fluid outlet 16, the housing 20, the fluid reservoir 22, the pump mechanism 26, the drip tray 40, or the smart cover 26, as shown in the drawings. Rather, any fluid dispenser 10 construction could be used, including for example those taught in U.S. Pat. No. 8,245,877 to Ophardt, issued Aug. 21, 2012; U.S. Pat. No. 8,113,388 to Ophardt et al., issued Feb. 14, 2012; U.S. Pat. No. 8,091,739 to Ophardt et al., issued Jan. 10, 2012; U.S. Pat. No. 7,748,573 to Anhuf et al., issued Jul. 6, 2010; U.S. Pat. No. 7,984,825 to Ophardt et al., issued Jul. 26, 2011; U.S. Pat. No. 8,684,236 to Ophardt, issued Apr. 1, 2014; U.S. Pat. No. 5,373,970 to Ophardt, issued Dec. 20, 1994; U.S. Pat. No. 5,836,482 to Ophardt et al., issued Nov. 17, 1998; and U.S. Pat. No. 9,682,390 to Ophardt et al., issued Jun. 20, 2017, which are each incorporated herein by reference.

The temperature sensor 42 could have any suitable construction and could be placed at any suitable location. The temperature sensor 42 may, for example, include a contactless infrared thermometer. The dispenser 10 could also incorporate multiple temperature sensors 42 at multiple locations, including for example separate temperature sensors 42 for detecting whether fluid 14 has been dispensed onto the user's hand 18 and for detecting whether fluid 14 has been dispensed onto the drip tray 40. The temperature sensor 42 could also be configured to detect whether fluid 14 has been dispensed onto other objects, such as for example a cloth or a sponge placed below the fluid outlet 16, with the processor 66 determining whether the fluid 14 has been dispensed onto the other objects based on a change in temperature of an external surface 46 presented by the objects.

The indicator light 48 could have a different location and/or a different set of illumination states than have been described. The dispenser 10 could also incorporate multiple indicator lights 48, with for example separate indicator lights 48 being used to indicate when the threshold volume of fluid 14 has been dispensed, when less than the threshold volume of fluid 14 has been dispensed, and when the dispenser 10 requires maintenance.

In various embodiments of the invention, the dispenser 10 optionally does not include one or more of the features described and shown in the preferred embodiments, including for example the actuator lever 12, the drip tray 40, the indicator light 48, the display screen 54, the hand sensor 56, the user sensor 58, the communication device 70, the battery 72, the pump activation sensor 74, the timer 76, the reservoir sensor 78, and/or the electronic pump activation mechanism 86.

In some embodiments of the invention, the determination as to whether fluid 14 has been dispensed from the fluid dispenser 10 could be made by a processor 66 located remotely from the fluid dispenser 10. For example, the temperature data from the temperature sensor 42 could be communicated to a remote computer, for example via the communication device 70, before the data is processed. The temperature sensor 42 could also be located remotely from the dispenser 10. For example, a standalone temperature sensor 42 could be mounted on a wall adjacent to the fluid dispenser 10. Other components that have been described in the preferred embodiments as being part of the dispenser 10 could also be located remotely from the dispenser 10, such as for example the indicator light 48 or the display screen 54.

The smart cover 26 preferably carries a power source and all of the electronics necessary to provide a set of smart capabilities. The smart cover 26 may optionally be sold on its own as an upgrade or replacement part for upgrading or updating an existing fluid dispenser 10. For example, the smart cover 26 could replace the nozzle shield shown and described in U.S. Pat. No. 7,748,573 to Anhuf et al. on an existing fluid dispenser 10, to thereby give the fluid dispenser 10 a set of smart capabilities.

The temperature sensor 42 could be controlled and operated in any desired manner so as to suitably provide an indication as to whether or not fluid 14 has been dispensed from the dispenser 10. The temperature sensor 42 could for example be configured to take one, two, three, four, five, tens, hundreds, or thousands of temperature measurements during each user interaction and/or each activation of the pump mechanism 24. The temperature sensor 42 could be configured to take temperature measurements on a continuous or periodic basis, or to only take temperature measurements when a trigger condition is satisfied. Preferably, for each user interaction and/or for each activation of the dispenser 10, the temperature sensor 42 takes at least a first temperature measurement before any fluid 14 has been dispensed from the dispenser 10 and a second temperature measurement that occurs after the fluid 14 has been dispensed, or if no fluid 14 has been dispensed, in the time period after the fluid 14 would have been dispensed during a dispensing activation. The first temperature measurement may occur, for example, before the pump mechanism 24 is activated, or during the activation of the pump mechanism 24 at a time before the dispensed fluid 14, if any, has had enough time to reach the user's hand 18. The second temperature measurement may occur, for example, after the activation of the pump mechanism 24, or during the activation of the pump mechanism 24 at a time after the dispensed fluid 14, if any, has had enough time to reach the user's hand 18.

The processor 66 may be configured or programmed to make any desired use of the temperature data received from the temperature sensor 42. If the processor 66 is configured to determine the volume of fluid 14 dispensed from the dispenser 10 based, at least in part, on the temperature data received from the temperature sensor 42, the processor 66 may be configured to determine the volume of fluid 14 dispensed over any desired time period, including for example each activation of the pump mechanism 24, each user interaction, each reservoir usage period, each day, or each hour.

In addition to the temperature data received from the temperature sensor 42, the processor 66 may use any additional information or data to perform any desired calculation or determination. For example, the processor 66 may rely on data from the pump activation sensor 74, the hand sensor 56, the user sensor 58, and/or the timer 76, in addition to the data from the temperature sensor 42, to make a determination as to whether fluid 14 has been dispensed onto the user's hand 18. The processor 66 could also be configured to determine whether fluid 14 has been dispensed onto the user's hand 18 based on data from the temperature sensor 42 alone.

The various thresholds described herein, including for example the threshold change in temperature for determining that fluid 14 has been dispensed, the threshold volume of fluid 14, the threshold quantity of activations, and the threshold reservoir volume could have any desired value. The threshold values could be set, for example, based on experimentation to determine the values that are most advantageous in a given context and for a given purpose. The values could be pre-programmed into the memory 68 and/or could be updated periodically based on data received from the communication device 70. The threshold values could, for example, be adjusted over time based on the output of a computer learning algorithm.

Although the fluid 18 is preferably a hand cleaning fluid, such as hand soap or hand sanitizer, the dispenser 10 could be used to dispense other fluids as well. The term "fluid" as used herein includes any flowable substance, including liquids, foams, emulsions, and dispersions.

In some embodiments of the invention, the fluid 14 that is dispensed from the fluid dispenser 10 could have a higher temperature than the user's hand 18 and/or the drip tray 40. This might occur, for example, if the fluid 14 is heated to improve its sanitizing effect. In such a circumstance, the processor 66 could be configured to determine that fluid 14 has been dispensed onto the user's hand 18 and/or onto the drip tray 40 if the temperature of the external surface 46 presented by the user's hand 18 and/or the drip tray 40 increases over time, rather than decreases as described above.

In the embodiments of the invention described above, determining whether the fluid 14 has been dispensed, based on the temperature of the external surface 46 presented by the user's hand 18 and/or the drip tray 40, may be used to determine an operational status of the fluid dispenser 10. For example, if upon activation of the pump mechanism 24 the temperature of the external surface 46 changes in a manner that indicates that the fluid 14 has been dispensed, this suggests that the operational status of the fluid dispenser 10 is that the fluid dispenser 10 is operating normally. Alternatively, if upon activation of the pump mechanism 24 the temperature of the external surface 46 does not change, this could suggest that the operational status of the fluid dispenser 10 is one or more of the following: the pump mechanism 24 needs to be primed; the fluid reservoir 22 of the fluid dispenser 10 is empty; the fluid dispenser 10 is malfunctioning; and/or the fluid dispenser 10 requires service. If the temperature of the external surface 46 changes without the pump mechanism 24 being activated, this may suggest that the operational status of the fluid dispenser 10 is that the pump mechanism 24 is leaking.

The processor 66 may, for example, be programmed to determine the operational status of the fluid dispenser 10 based at least in part on the determination as to whether the fluid 14 has been dispensed. The processor 66 may optionally also use other information, data, and/or inputs to determine the operational status of the fluid dispenser 10, such as for example information about when the fluid reservoir 22 was installed; whether the pump mechanism 24 has been primed; when the pump mechanism 24 was last primed; and the history of dispensing and non-dispensing activations of the pump mechanism 24 recorded over time.

In some embodiments of the invention, the processor 66 may be programed to determine the operational status of the fluid dispenser 10 each time the pump mechanism 24 is activated. For example, in some embodiments of the invention the processor 66 could be configured to determine that the fluid dispenser 10 needs service after a single non-dispensing activation, that is, an activation of the pump mechanism 24 in which no fluid 14 is dispensed. The processor 66 may also be configured to provide an indication that the dispenser 10 requires service, such as by illuminating the indicator light 48 or sending an electronic alert to maintenance staff.

In some embodiments of the invention, a single non-dispensing activation may provide a reliable indication that the fluid reservoir 22 is empty and needs to be refilled and/or replaced. This may be the case, for example, in embodiments where the fluid dispenser 10 is touchlessly operated and automatically primed on installation of the fluid reservoir 22, and where the pump mechanism 24 is of a type that is known to stay primed for long periods of time between activations. In this circumstance, the processor 66 may be configured to determine that the fluid reservoir 22 is empty if a single non-dispensing activation is detected. The processor 66 may be configured to determine that the fluid reservoir 22 is empty if a single non-dispensing activation is detected in other circumstances as well.

Optionally, the processor 66 may take into account additional information when determining the operational status of the dispenser 10. For example, the processor 66 may be configured to estimate the volume of fluid 14 remaining in the fluid reservoir 22 over time, and to use this information when determining the operational status of the dispenser 10. If, for example, the estimated volume of fluid 14 remaining in the fluid reservoir 22 is high, and a non-dispensing activation is detected, the processor 66 may be configured to determine that the fluid dispenser 10 is malfunctioning, which might occur for example if the fluid dispenser 10 has been damaged by a forceful manual activation of the pump mechanism 24. Alternatively, if the estimated volume of fluid 14 remaining in the fluid reservoir 22 is low, and a non-dispensing activation is detected, the processor 66 could be configured to determine that the fluid reservoir 22 is empty.

Optionally, the processor 66 may provide different indications to maintenance staff or others based on the operational status that has been determined. For example, if the processor 66 determines that the fluid dispenser 10 is malfunctioning, an e-mail alert sent to maintenance staff may indicate that the fluid dispenser 10 is malfunctioning, and that replacement parts and/or tools should be brought to the site where the dispenser 10 is located. Alternatively, if the processor 66 determines that the fluid reservoir 22 is empty, the e-mail alert may indicate that the fluid reservoir 22 is empty and that a replacement reservoir 22, or a supply of the fluid 14 for refilling the reservoir 22, should be brought to the site where the dispenser 10 is located.

In some embodiments of the invention, the processor 66 may be configured to estimate the volume of fluid 14 remaining in the reservoir 22 over time, and to provide an indication when the volume of fluid 14 is getting low, for example by providing an alert to maintenance staff to replace or refill the reservoir 22. The processor 66 is preferably further configured to determine if the reservoir 22 is empty, for example upon detection of a single non-dispensing activation. If the processor 66 determines that the reservoir 22 is empty, the processor 66 may, for example, provide a further alert to maintenance staff indicating that the reservoir 22 is now empty and needs to be replaced or refilled urgently.

Figure 8:
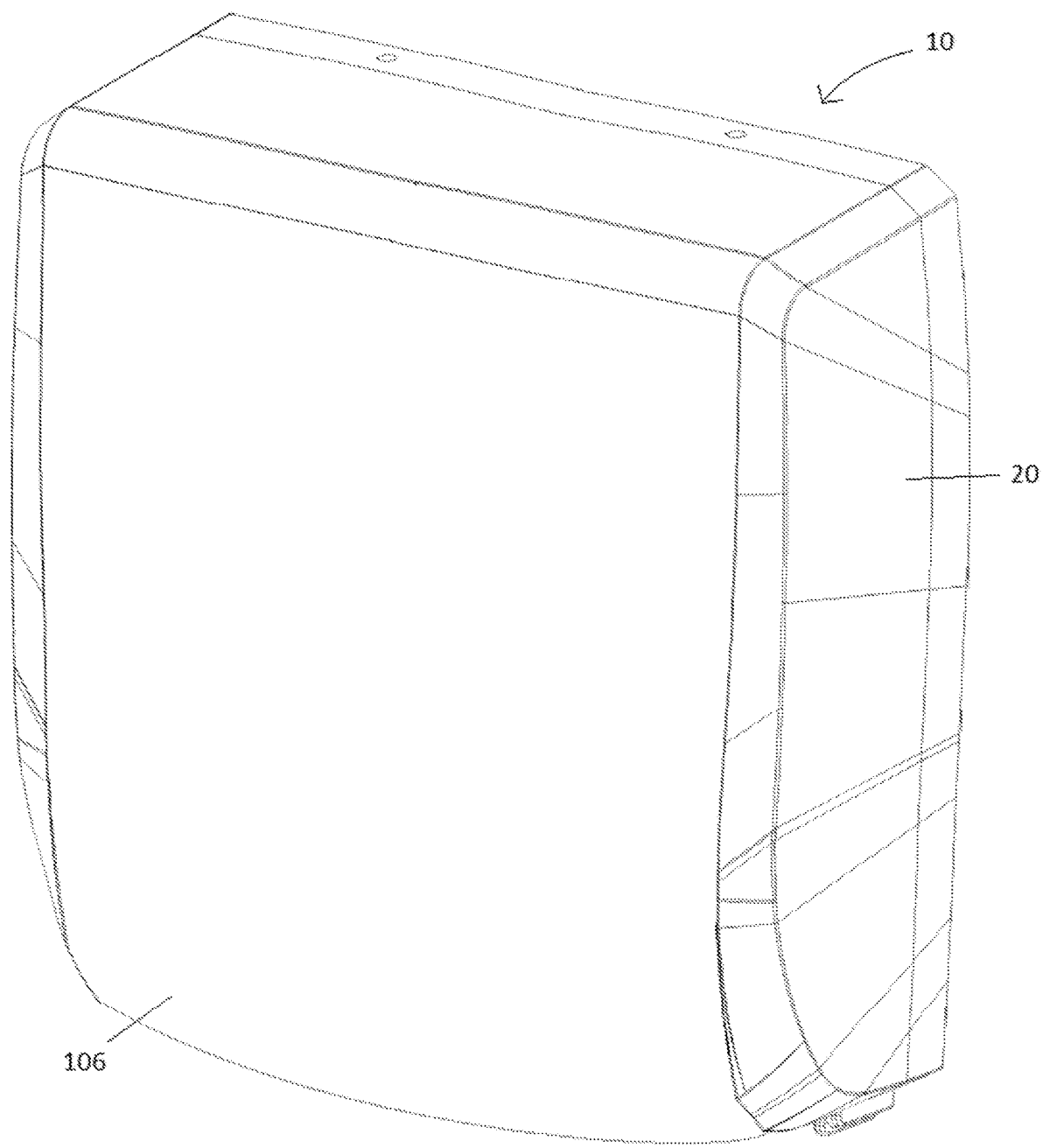
FIG. 8 is a perspective view of a fluid dispenser in accordance with a third embodiment of the present invention.
Figure 9:
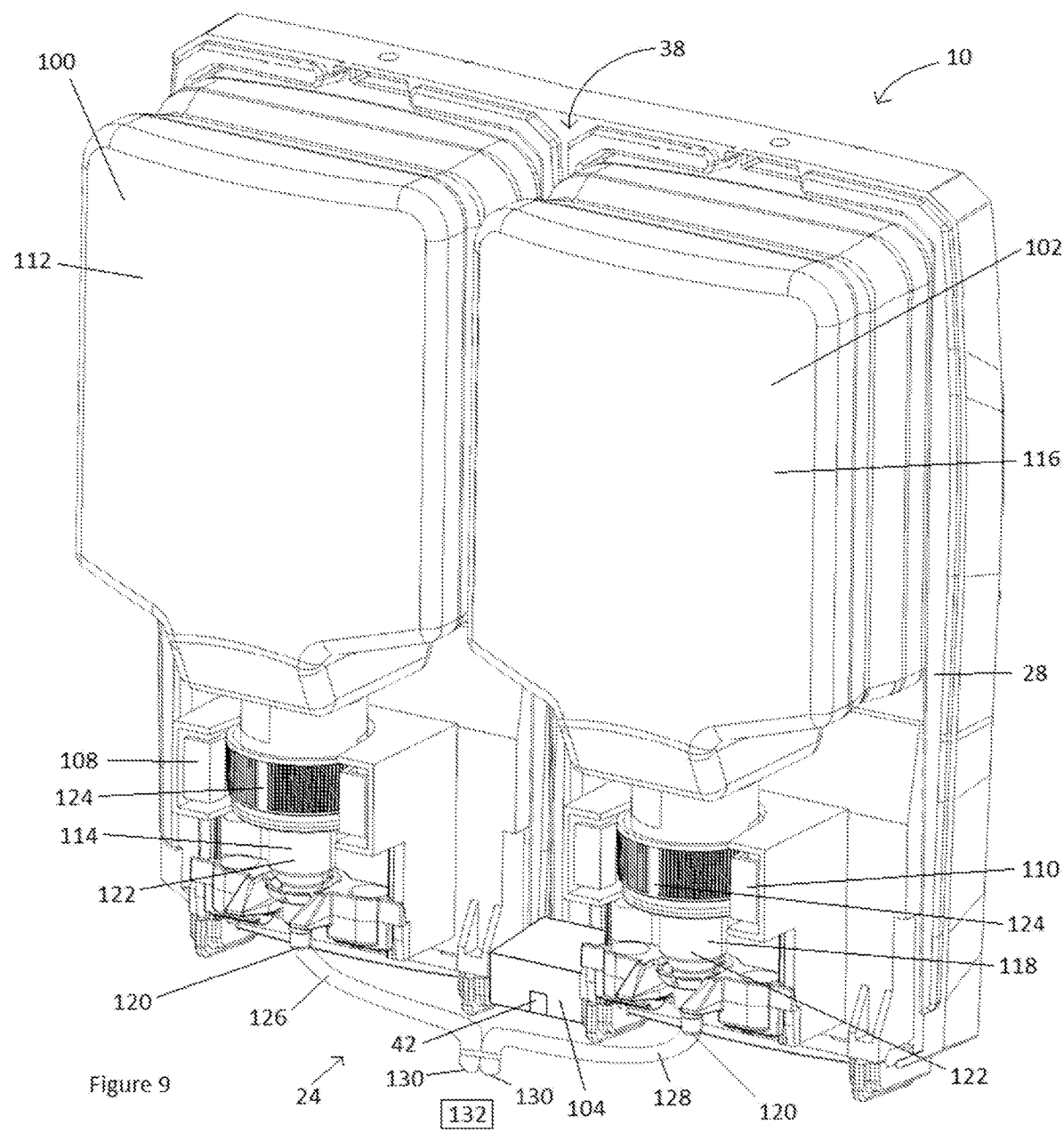
FIG. 9 is a perspective view of the fluid dispenser shown in FIG. 8, with a front cover of the fluid dispenser removed.

Reference is now made to FIGS. 8 and 9, which show a fluid dispenser 10 in accordance with a third embodiment of the present invention. Like numerals are used to denote like components.

The fluid dispenser 10 shown in FIGS. 8 and 9 has a housing 20, a first fluid cartridge 100, a second fluid cartridge 102, a pump mechanism 24, and a controller 104.

The housing 20 has a front cover 106 that is removably attached to a back plate 28, with an interior cavity 38 defined therebetween. The interior cavity 38 is sized to receive the first fluid cartridge 100 and the second fluid cartridge 102 side-by-side as shown in FIG. 9. The housing 20 has a first cartridge engagement member 108 that engages with the first fluid cartridge 100 and a second cartridge engagement member 110 that engages with the second fluid cartridge 102.

The first fluid cartridge 100 comprises a first fluid reservoir 112 containing a first supply of fluid 14, and a first piston pump 114 that is attached to an open bottom end of the first fluid reservoir 112. The second fluid cartridge 102 likewise comprises a second fluid reservoir 116 containing a second supply of the fluid 14, and a second piston pump 118 that is attached to an open bottom end of the second fluid reservoir 116. Each of the first fluid cartridge 100 and the second fluid cartridge 102 have a structure that closely corresponds to the cartridges shown and described in U.S. Pat. No. 10,242,301 to Ophardt et al., issued Mar. 26, 2019, which is incorporated herein by reference. The first piston pump 114 and the second piston pump 118 each have a structure that closely corresponds to the piston pumps shown and described in U.S. Pat. No. 9,682,390 to Ophardt et al., issued Jun. 20, 2017; U.S. Pat. No. 8,413,852 to Ophardt et al., issued Apr. 9, 2013; and U.S. Pat. No. 8,113,388 to Ophardt et al., issued Feb. 14, 2012, which are incorporated herein by reference.

The first piston pump 114 is configured to discharge fluid 14 from the first fluid reservoir 112 out through a discharge outlet 120 of the first piston pump 114 upon axial movement of a piston element 122 of the first piston pump 114 relative to a piston chamber forming body 124 of the first piston pump 114, in a manner as is known in the art. The second piston pump 118 is likewise configured to discharge fluid 14 from the second fluid reservoir 116 out through a discharge outlet 120 of the second piston pump 118 upon axial movement of a piston element 122 of the second piston pump 118 relative to a piston chamber forming body 124 of the second piston pump 118.

The pump mechanism 24 comprises the first piston pump 114, the second piston pump 118, a first fluid outlet tube 126, and a second fluid outlet tube 128. The first fluid outlet tube 126 is attached to the discharge outlet 120 of the first piston pump 144 for receiving the fluid 14 discharged from the first piston pump 114, and the second fluid outlet tube 128 is attached to the discharge outlet 120 of the second piston pump 118 for receiving the fluid 14 discharged from the second piston pump 118. The first fluid outlet tube 126 and the second fluid outlet tube 128 each have a dispensing end 130 from which the fluid 14 is dispensed, the dispensing end 130 of the first fluid outlet tube 126 being positioned adjacent to the dispensing end 130 of the second fluid outlet tube 128 at a central location 132 at the bottom of the fluid dispenser 10. The positioning of the dispensing ends 130 of the outlet tubes 126, 128 adjacent to each other allows a user 80 to receive fluid 14 from either of the outlet tubes 126, 128 by placing the user's hand 18 below the central location 132.

The first piston pump 114 and the second piston pump 118 are preferably activated touchlessly, as is known in the art. To simplify the drawings, the mechanism for touchlessly activating the piston pumps 114, 118 is not shown. Any suitable mechanism for touchless operation could be used, including for example those disclosed in U.S. Pat. No. 5,836,482 to Ophardt et al., issued Nov. 17, 1998; U.S. Pat. No. 7,984,825 to Ophardt et al., issued Jul. 26, 2011; U.S. Pat. No. 8,397,949 to Ophardt, issued Mar. 19, 2013; U.S.

Pat. No. 9,027,788 to Ophardt et al., issued May 12, 2015; U.S. Pat. No. 8,622,243 to Ophardt et al., issued Jan. 7, 2014; U.S. Pat. No. 8,733,596 to Ophardt et al., issued May 27, 2004; and U.S. Pat. No. 7,455,197 to Ophardt, issued Nov. 25, 2008, which are incorporated herein by reference. The dispenser 10 could, for example, include one or more electric motors for activating the first piston pump 114 and the second piston pump 118.

The controller 104 is provided to receive and process information, and to control the touchless activation of the pump mechanism 24. Although not shown in the drawings, the controller 104 may include a variety of different computer components, including one or more processors, one or more memory storage devices, a power source such as a battery, one or more communication devices, and one or more sensors. The controller 104 also includes a temperature sensor 42, which is configured to detect the temperature of an external surface 46 presented by the user's hand 18 when the user's hand 18 is placed in the area below the dispensing ends 130 of the outlet tubes 126, 128. The controller 104 is configured to determine whether fluid 14 has been dispensed onto the user's hand 18 based on the temperature of the external surface 46 presented by the user's hand 18 as detected by the temperature sensor 42, in the same way as in the first and second embodiments of the invention described above.

The controller 104 is preferably configured to activate the pump mechanism 24 when a user's hand 18 is detected in the area below the dispensing ends 130 of the outlet tubes 126, 128. The presence of the user's hand 18 is optionally detected by the temperature sensor 42, or could be detected by another hand detecting sensor, not shown. When activating the pump mechanism 24, the controller 104 is preferably configured to initially dispense fluid 14 from the first fluid reservoir 112 by operating the first piston pump 114.

If, upon activation of the first piston pump 114, the controller 104 determines that no fluid 14 was dispensed onto the user's hand 18 based on the temperature data received from the temperature sensor 42, the controller 104 is preferably configured to determine that the first fluid reservoir 112 is empty. Upon determining that the first fluid reservoir 112 is empty, the controller 104 is preferably configured to begin dispensing fluid 14 from the second fluid reservoir 116 by operating the second piston pump 118 during subsequent activations of the pump mechanism 24.

The controller 104 is also preferably configured to provide an indication when the first fluid reservoir 112 is determined to be empty, such as by sending an e-mail or text message alert to maintenance staff indicating that the first fluid cartridge 100 needs to be replaced. Maintenance staff can then replace the empty first fluid cartridge 100 with a third fluid cartridge containing a third supply of the fluid 14. Although not shown in the drawings, the third fluid cartridge is preferably identical to the first fluid cartridge 100 shown in FIG. 9.

The controller 104 preferably continues to dispense fluid 14 from the second fluid cartridge 102 until, upon activation of the second piston pump 118, the controller 104 determines that no fluid 14 was dispensed onto the user's hand 18 based on the temperature data received from the temperature sensor 42. The controller 104 is then preferably configured to begin dispensing fluid 14 from the third fluid cartridge, and to provide an indication to maintenance staff that the second fluid reservoir 116 is empty. This process preferably continues indefinitely, with the controller 104 switching which cartridge 100, 102 to dispense fluid 14 from each time one of the cartridges 100, 102 is determined to be empty.

The fluid dispenser 10 shown in FIGS. 8 and 9 is thus preferably able to provide a reliable and uninterrupted supply of the fluid 14, with the fluid dispenser 10 never becoming completely empty, so long as maintenance staff are able to replace each empty cartridge 100, 102 before the supply of fluid 14 in the other cartridge 100, 102 runs out. Furthermore, the fluid dispenser 10 preferably provides the advantage of allowing each fluid reservoir 112, 116 to become completely empty before it is replaced. This preferably reduces waste, as compared, for example, to a dispenser with a single reservoir that would need to be replaced before the reservoir is completely empty, in order to avoid the situation of the dispenser having no fluid available for dispensing.

The inverted orientation of the fluid reservoirs 112, 116, with the piston pumps 114, 118 located at the open bottom ends of the reservoirs 112, 116, also preferably reduces waste by allowing all of the fluid 14 contained in the reservoirs 112, 116 to be completely drained from the reservoirs 112, 116 before the reservoirs 112, 116 are determined to be empty. The temperature sensor 42 preferably provides a reliable method for determining when the reservoirs 112, 116 are empty, such that other methods of monitoring the volume of fluid 14 in the reservoirs 112, 116, such as by counting activations of the pump mechanism 24 and/or directly monitoring fluid levels in the reservoirs 112, 116, may optionally be omitted.

Preferably, the controller 104 is configured to automatically prime the pump mechanism 24. For example, when the first fluid cartridge 100 is installed in the housing 20, the controller 104 preferably primes the pump mechanism 24 by repeatedly operating the first piston pump 114 until fluid 14 is dispensed from the dispensing end 130 of the first fluid outlet tube 126. The dispensing of fluid 14 may be detected, for example, using the temperature sensor 42 to detect the temperature of an external surface 18 presented by a drip tray 40 and/or a user's hand 18, as described above. Alternatively, the controller 104 could be configured to repeatedly activate the first piston pump 114 a number of times that is known or expected to be sufficient to prime the pump mechanism 24, without requiring the detection of fluid 14 being dispensed. The installation of the first fluid cartridge 100 could be detected by any suitable mechanism, including for example by a sensor, not shown, that detects when the cartridge 100 is installed. The controller 104 is also preferably configured to automatically prime the pump mechanism 24 each time that the controller 104 switches which cartridge 100, 102 fluid 14 will be dispensed from. Automatically priming the pump mechanism 24 preferably helps to avoid the situation of the controller 104 erroneously determining that a fluid reservoir 112, 116 is empty when the fluid reservoir 112, 116 is not empty, but the pump mechanism 24 simply needs to be primed.

Optionally, the controller 104 is configured to take into consideration at least some of the dispensing history of the fluid dispenser 10 when determining whether the fluid reservoirs 112, 116 are empty. For example, the controller 104 may be configured to determine whether the first fluid reservoir 112 is empty by: determining that the fluid 14 was dispensed from the fluid dispenser 10 after at least one activation of the pump mechanism 24; and determining that the first fluid reservoir 112 is empty if the determination is made that no fluid 14 was dispensed from the fluid dispenser 10 after at least one subsequent activation of the pump mechanism 24. This procedure preferably helps to avoid the controller 104 erroneously determining that the first fluid reservoir 112 is empty when in fact the pump mechanism 24 simply needs to be primed. The controller 104 may, for example, be configured to determine that the pump mechanism 24 needs to be primed if the determination is made that no fluid 14 was dispensed from the fluid dispenser 10 after an activation of the pump mechanism 24, and it is also determined that no fluid 14 has been dispensed from the pump mechanism 24 in a given time period preceding the activation. The time period could, for example, be defined as the time since the fluid reservoir 112, 116 was installed, or the time since the controller 104 last switched which fluid reservoir 112, 116 fluid 14 is dispensed from. Upon determining that the pump mechanism 24 needs to be primed, the controller 104 is preferably configured to automatically prime the pump mechanism 24 without requiring further input or instructions from a user or maintenance staff.

The term "processor" as used herein is intended to refer broadly to any computer component or group of computer components that are capable of processing information, including a single processor, a group of processors that are located close together or remotely from each other, as well as other computer components that work together to provide information processing functions, including memory and communication components. The controller 104 of the embodiment shown in FIGS. 8 and 9 optionally includes a processor 66 that is configured to perform all of the same functions as the processor 66 of the embodiments shown in FIGS. 1 to 7.

The expressions "completely empty" and "completely drained" as used herein means effectively drained as far as possible, having regard to the cartridge/bottle/pump/outlet configuration and the nature of the fluid 14, notably viscosity.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

I claim:

1. A fluid dispenser comprising:
   a drip tray;
   a temperature sensor that senses a temperature of an external surface presented by the drip tray;
   a fluid outlet that is positioned above the drip tray;
   a pump mechanism that is configured to dispense fluid from the fluid outlet when the pump mechanism is activated; and
   a processor that determines, based at least in part on the temperature of the external surface presented by the drip tray, whether the fluid has been dispensed.

2. The fluid dispenser according to claim 1, wherein the processor determines whether the fluid has been dispensed based at least in part on whether the temperature sensor senses a change in the temperature of the external surface presented by the drip tray over time.

3. The fluid dispenser according to claim 2, wherein the processor determines whether the fluid has been dispensed based at least in part on whether the temperature sensor senses a decrease in the temperature of the external surface presented by the drip tray over time.

4. The fluid dispenser according to claim 3, further comprising an electronic pump activation mechanism for activating the pump mechanism;
   wherein, when the electronic pump activation mechanism is used to activate the pump mechanism in a first activation time period, the processor is configured to determine, based at least in part on the temperature of the external surface presented by the drip tray, whether the fluid has been dispensed in the first activation time period;
   wherein, if the processor determines that no fluid was dispensed in the first activation time period, the processor is configured to repeatedly use the electronic pump activation mechanism to activate the pump mechanism in subsequent activation time periods until a stop condition is satisfied;
   wherein the stop condition is satisfied when the processor determines at least one of:
   that the fluid has been dispensed, based at least in part on the temperature of the external surface presented by the drip tray; and
   that a quantity of the activations of the pump mechanism exceeds a threshold activation quantity;
   wherein the processor is configured to use the electronic pump activation mechanism to activate the pump mechanism in the first activation time period when a trigger condition is satisfied;
   wherein the trigger condition comprises at least one of:
   detection of a user;
   a threshold time interval passing since the pump mechanism was last activated; and
   arrival of a scheduled activation time;
   wherein the processor is configured to determine an operational status of the fluid dispenser based at least in part on the determination as to whether the fluid has been dispensed;
   wherein the operational status comprises one or more of:
   i) whether the pump mechanism needs to be primed;
   ii) whether a fluid reservoir of the fluid dispenser is empty;
   iii) whether the fluid dispenser is malfunctioning;
   iv) whether the fluid dispenser requires service; and
   v) whether the pump mechanism is leaking;
   wherein the processor is configured to provide an indication of the operational status; and
   wherein the processor provides the indication of the operational status by at least one of:
   illuminating a light;
   providing an alert;
   displaying a message; and
   transmitting an electronic signal.

5. The fluid dispenser according to claim 2, wherein the processor determines a volume of the fluid that has been dispensed from the fluid dispenser based at least in part on the temperature of the external surface presented by the drip tray.

6. The fluid dispenser according to claim 2, further comprising an electronic pump activation mechanism for activating the pump mechanism;
   wherein, when the electronic pump activation mechanism is used to activate the pump mechanism in a first activation time period, the processor is configured to determine, based at least in part on the temperature of the external surface presented by the drip tray, whether the fluid has been dispensed in the first activation time period; and
   wherein, if the processor determines that no fluid was dispensed in the first activation time period, the processor is configured to repeatedly use the electronic pump activation mechanism to activate the pump mechanism in subsequent activation time periods until a stop condition is satisfied.

7. The fluid dispenser according to claim 6, wherein the stop condition is satisfied when the processor determines at least one of:
that the fluid has been dispensed, based at least in part on the temperature of the external surface presented by the drip tray; and
that a quantity of the activations of the pump mechanism exceeds a threshold activation quantity.

8. The fluid dispenser according to claim 6, wherein the processor is configured to use the electronic pump activation mechanism to activate the pump mechanism in the first activation time period when a trigger condition is satisfied.

9. The fluid dispenser according to claim 8, wherein the trigger condition comprises at least one of:
detection of a user;
a threshold time interval passing since the pump mechanism was last activated; and
arrival of a scheduled activation time.

10. The fluid dispenser according to claim 2, wherein the processor is configured to determine an operational status of the fluid dispenser based at least in part on the determination as to whether the fluid has been dispensed.

11. The fluid dispenser according to claim 10, wherein the operational status comprises one or more of:
i) whether the pump mechanism needs to be primed;
ii) whether a fluid reservoir of the fluid dispenser is empty;
iii) whether the fluid dispenser is malfunctioning;
iv) whether the fluid dispenser requires service; and
v) whether the pump mechanism is leaking.

12. The fluid dispenser according to claim 10, wherein the processor is configured to provide an indication of the operational status.

13. The fluid dispenser according to claim 12, wherein the processor provides the indication of the operational status by at least one of:
illuminating a light;
providing an alert;
displaying a message; and
transmitting an electronic signal.

14. The fluid dispenser according to claim 2, wherein the processor is configured to determine whether a fluid reservoir of the fluid dispenser is empty based at least in part on the determination as to whether the fluid has been dispensed.

15. The fluid dispenser according to claim 14, wherein the processor is configured to provide an indication when the determination is made that the fluid reservoir is empty.

16. The fluid dispenser according to claim 2, wherein the processor is configured to determine whether the fluid dispenser is malfunctioning based at least in part on the determination as to whether the fluid has been dispensed.

17. The fluid dispenser according to claim 16, wherein the processor is configured to provide an indication when the determination is made that the fluid dispenser is malfunctioning.

18. The fluid dispenser according to claim 2, wherein the processor is configured to determine whether the fluid dispenser requires service based at least in part on the determination as to whether the fluid has been dispensed.

19. The fluid dispenser according to claim 18, wherein the processor is configured to provide an indication when the determination is made that the fluid dispenser requires service.

20. The fluid dispenser according to claim 2, wherein the processor is configured to determine whether the pump mechanism is leaking based at least in part on the temperature of the external surface presented by the drip tray.

* * * * *